(12) United States Patent
Fong et al.

(10) Patent No.: US 8,912,419 B2
(45) Date of Patent: Dec. 16, 2014

(54) SYNCHRONIZED MULTIPLE DEVICE AUDIO PLAYBACK AND INTERACTION

(75) Inventors: Peter Sui Lun Fong, Monterey Park, CA (US); Kelvin Yat Kit Fong, Monterey Park, CA (US); Xi-Song Zhu, Dongguan (CN); Chun-Yan Liu, Dongguan (CN)

(73) Assignee: Peter Sui Lun Fong, Monterey Park, CA (US)

( * ) Notice: Subject to any disclaimer, the term of this patent is extended or adjusted under 35 U.S.C. 154(b) by 62 days.

(21) Appl. No.: 13/476,867

(22) Filed: May 21, 2012

(65) Prior Publication Data

US 2013/0305903 A1 Nov. 21, 2013

(51) Int. Cl.
*G10H 7/00* (2006.01)

(52) U.S. Cl.
USPC .................................. 84/600; 84/602; 84/609

(58) Field of Classification Search
USPC .................... 84/600–602, 609, 649
See application file for complete search history.

(56) References Cited

U.S. PATENT DOCUMENTS

| | | | | |
|---|---|---|---|---|
| 3,872,766 | A * | 3/1975 | Fukui ............................ | 84/115 |
| 4,245,430 | A | 1/1981 | Hoyt | |
| 4,272,915 | A | 6/1981 | Noble | |
| 4,717,364 | A | 1/1988 | Furukawa | |
| 4,840,602 | A | 6/1989 | Rose | |
| 4,904,222 | A * | 2/1990 | Gastgeb et al. ............... | 446/405 |
| 4,949,327 | A | 8/1990 | Forsse et al. | |
| 6,110,000 | A * | 8/2000 | Ting ............................. | 446/302 |
| 6,309,275 | B1 * | 10/2001 | Fong et al. .................... | 446/297 |
| 6,375,535 | B1 * | 4/2002 | Fong et al. .................... | 446/297 |
| 6,454,625 | B1 * | 9/2002 | Fong et al. .................... | 446/297 |
| 6,497,604 | B2 * | 12/2002 | Fong et al. .................... | 446/297 |
| 6,497,606 | B2 * | 12/2002 | Fong et al. .................... | 446/297 |
| 6,497,607 | B1 * | 12/2002 | Hampton et al. ............. | 446/301 |
| 6,514,117 | B1 * | 2/2003 | Hampton et al. ............. | 446/301 |
| 6,641,454 | B2 * | 11/2003 | Fong et al. .................... | 446/297 |
| 6,682,392 | B2 * | 1/2004 | Chan ............................. | 446/335 |
| 6,686,530 | B2 * | 2/2004 | Juszkiewicz et al. ......... | 84/600 |
| 6,822,154 | B1 * | 11/2004 | Thai .............................. | 84/609 |
| 7,030,308 | B2 * | 4/2006 | Yagi .............................. | 84/484 |
| 7,120,257 | B2 | 10/2006 | Mahoney | |
| 7,297,044 | B2 * | 11/2007 | Small et al. ................... | 446/454 |
| 7,709,725 | B2 * | 5/2010 | Toledano et al. ............. | 84/615 |
| 8,364,005 | B2 * | 1/2013 | Lee et al. ...................... | 386/201 |
| 8,444,452 | B2 * | 5/2013 | Dang et al. ................... | 446/397 |
| 8,461,444 | B2 * | 6/2013 | Miwa ............................ | 84/645 |
| 2004/0038620 | A1 * | 2/2004 | Small et al. ................... | 446/491 |

(Continued)

OTHER PUBLICATIONS

Elan Microelectronics Corp., "User's Manual" Doc. Version 1.3, Nov. 2007.

(Continued)

*Primary Examiner* — David S. Warren

(74) *Attorney, Agent, or Firm* — Stetina Brunda Garred & Brucker

(57) ABSTRACT

A musical playback amusement system is disclosed. A primary audio track defined by a plurality of time-sequence audio data elements and associated synchronization identifiers are loaded and played back on a first interactive device. A second interactive device is in communication with the first interactive device to receive playback synchronization commands that coordinates playback of a secondary track loaded on the second interactive device. The synchronization identifiers in the primary track are transmitted from the first to the second interactive device as the playback synchronization commands in coordination with the playback of the primary audio track.

27 Claims, 22 Drawing Sheets

(56) References Cited

U.S. PATENT DOCUMENTS

| | | | |
|---|---|---|---|
| 2005/0098022 A1* | 5/2005 | Shank et al. | 84/612 |
| 2006/0130636 A1* | 6/2006 | Toledano et al. | 84/600 |
| 2006/0266201 A1* | 11/2006 | Le et al. | 84/645 |
| 2010/0005951 A1* | 1/2010 | Le et al. | 84/464 R |
| 2010/0218664 A1* | 9/2010 | Toledano et al. | 84/615 |
| 2012/0160080 A1* | 6/2012 | Miwa | 84/623 |
| 2013/0032023 A1* | 2/2013 | Pulley et al. | 84/645 |
| 2013/0276620 A1* | 10/2013 | Uehara et al. | 84/645 |
| 2013/0305903 A1* | 11/2013 | Fong et al. | 84/609 |

OTHER PUBLICATIONS

Macronix International Co., Ltd. "MXIC" Oct. 13, 2005.
Elan Microelectronics Corp., "Reference Guide" Doc. Version 1.3, Nov. 2007.

* cited by examiner

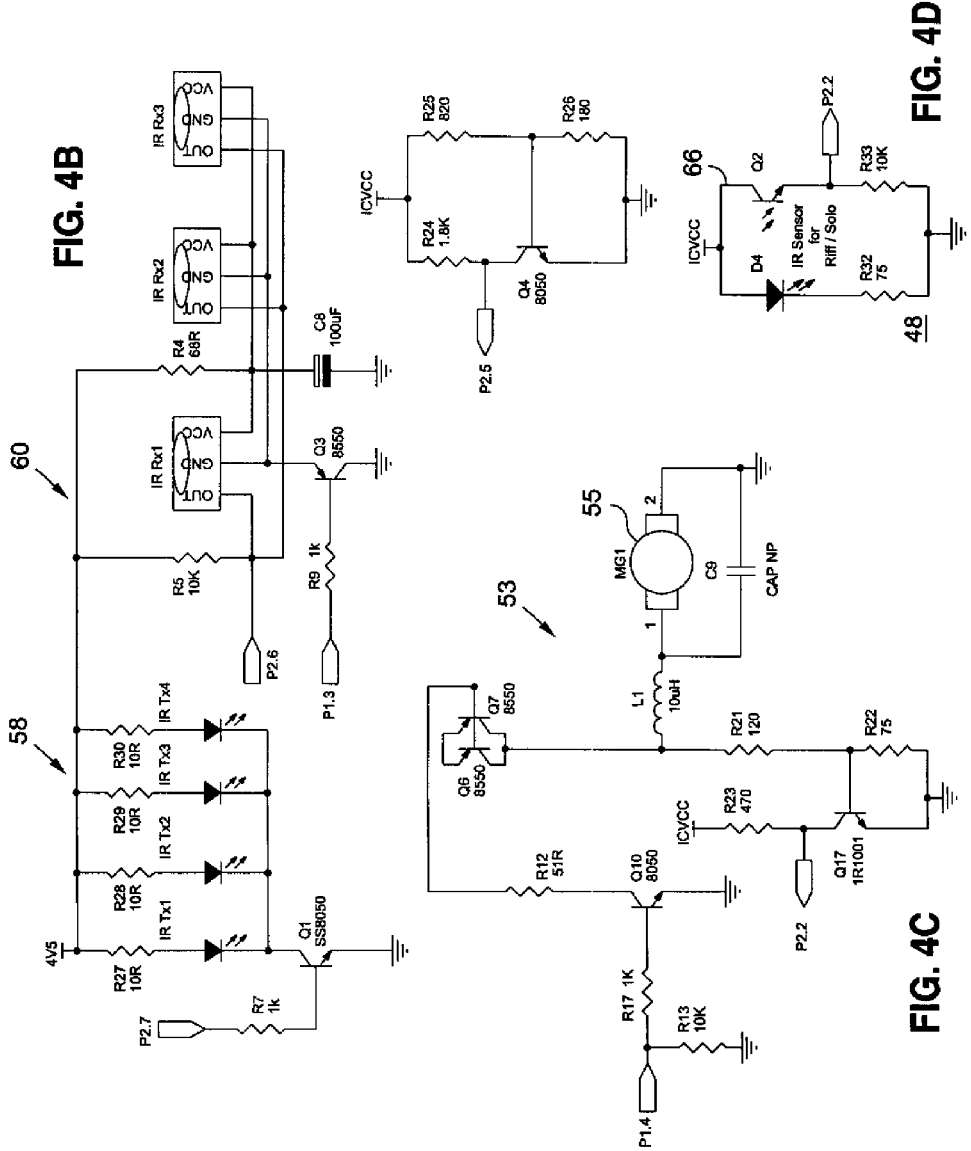

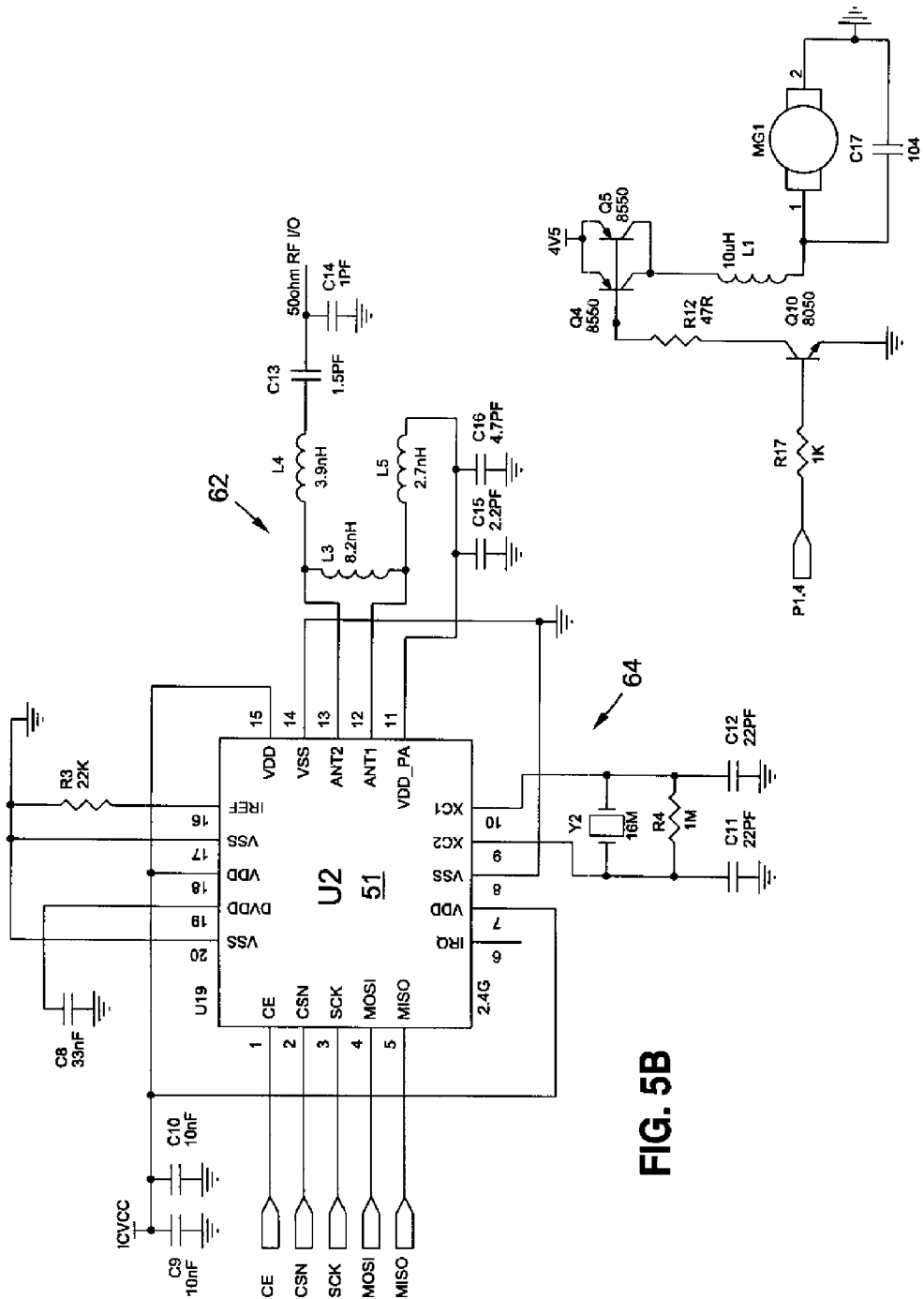

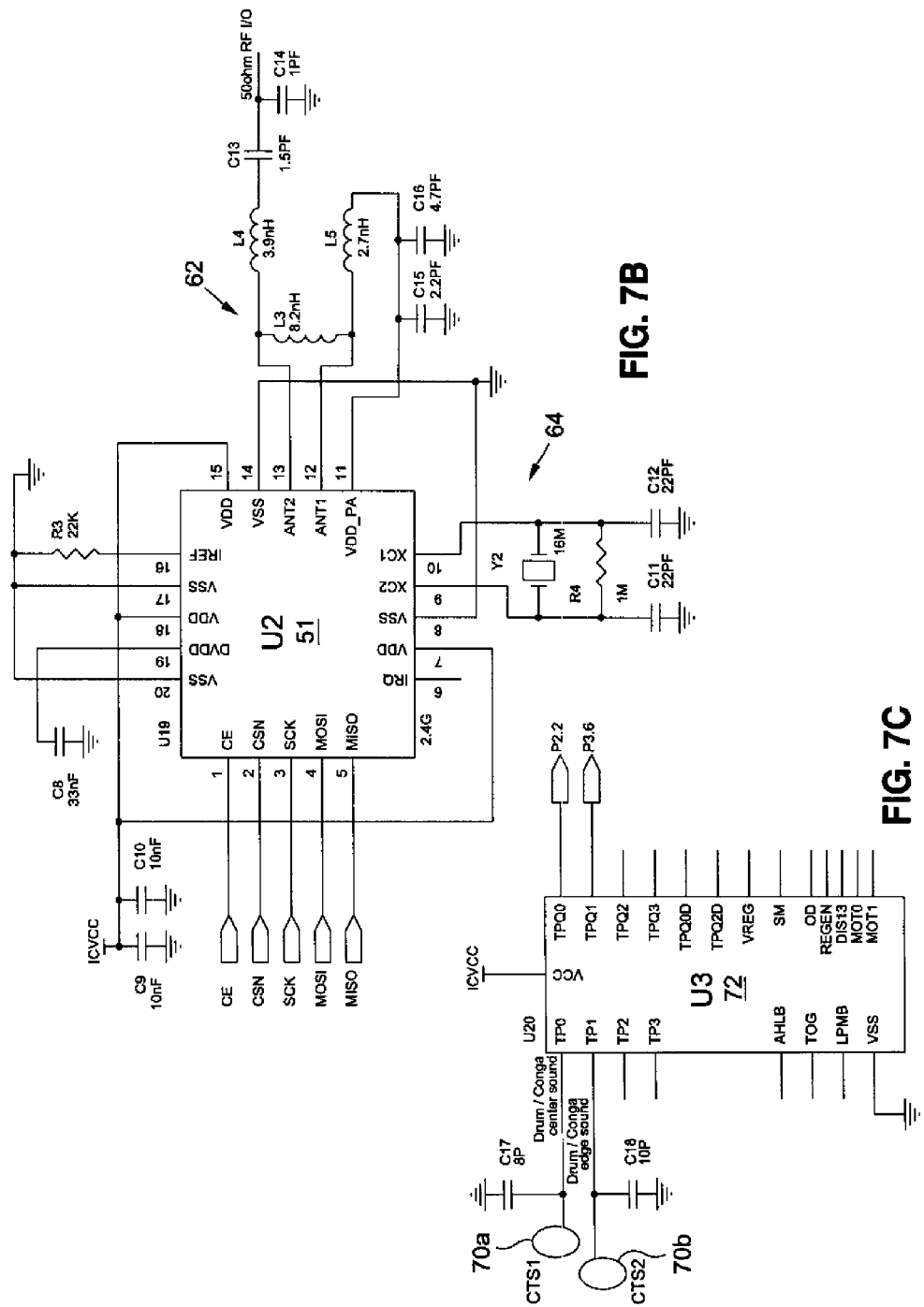

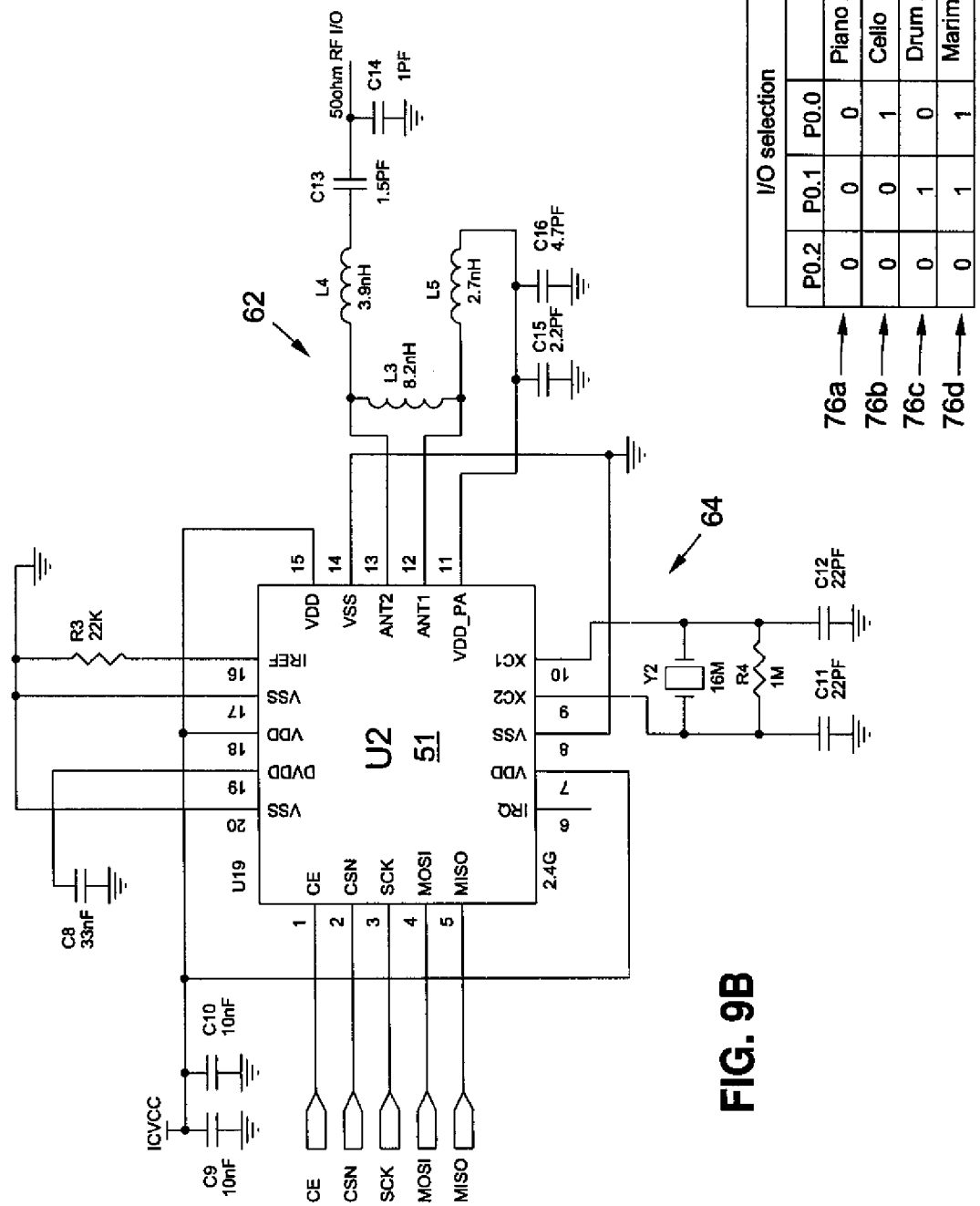

SYNCHRONIZED MULTIPLE DEVICE AUDIO PLAYBACK AND INTERACTION

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Technical Field

The present disclosure relates generally to toys and various interactive entertainment/amusement devices, as well as playing music and other sounds thereon. More particularly, the present disclosure relates to synchronized multiple device audio playback and interaction.

2. Related Art

Children are often attracted to interactive amusement devices that provide both visual and aural stimulation. In recognizing this attraction, a wide variety have been developed throughout recent history, beginning with the earliest "talking dolls" that produced simple phrasings with string-activated wood and paper bellows, or crying sounds with weight activated cylindrical bellows having holes along its side. These talking dolls were typically limited to crying "mama" or "papa."

Another well-known apparatus that generates sounds is the music box, which is generally comprised of a comb with each tooth thereof having a specific length that, when mechanically plucked, emits a sound at a particular frequency or musical note. A disc or cylinder having pins or other protuberances was rotated along the comb at a set speed by a clockwork mechanism that was manually wound. The position of the pins could be variously arranged and spaced to pluck the desired tooth of the comb at a specific time and combined to reproduce a musical composition. Music boxes were typically standalone devices enclosed in snuff boxes, though due to their relatively small size, they could be incorporated into dolls and other toys.

Further advancements utilized wax cylinder phonograph recordings. Various phrases were recorded on the phonographs for playback through the dolls to simulate dialogue. Still popular among collectors today, one historically significant embodiment of a talking doll is the "Bebe Phonographe" made by the Jumeau Company in the late 19th century. In addition to spoken words, music was also recorded on the phonograph so that the doll could sing songs and nursery rhymes.

Beyond the audio output capabilities, efforts to make dolls more lifelike led to movable limbs and facial features. In some cases the movement of such features was coordinated with the audio output. For example, when a phrase was uttered, the jaws of the doll could be correspondingly moved. The instructions required for such synchronized animation of the features of the doll were stored in a cassette recording that included the electrical control signals for the servo motors actuating the movable features along with the audio signal.

As the use of digital electronics became more feasible and cost effective, gradually all functions of the toys have come to be implemented on programmable integrated circuit devices such as microcontrollers. The play pattern or routine, including all audio information and mechanical actuation sequences therefor, are stored on memory devices for subsequent retrieval and processing by the microcontroller. Pursuant to the specific programmed instructions, digital audio data is passed to a digital-to-analog converter, with the resulting analog signal being passed to an audio transducer (speaker). Movements of the mechanical features of the toys is represented as a series of motor activation and deactivation signals, which are also generated by the processor pursuant to the programmed instructions.

Earlier digital processor-operated dolls were typically single standalone units that functioned autonomously. To the extent any external inputs affected its play pattern, such inputs were received from the user via buttons, sensors, and other on-board devices connected to the processor. In more sophisticated devices, wired or wireless remote control devices could communicate with the doll to provide operational directions thereto. The availability of inter-processor data communication modalities in microcontrollers led to the development of systems of multiple dolls that can communicate with each other. While each doll can have its own play routine, the flow of that routine may be altered by input signals received from another doll. For example, one doll could generate a first part of a dialogue, while another doll could respond with a second part of the same dialogue.

Along the same lines as talking/singing dolls, musical instruments, and simplified versions thereof, are also popular amusement devices for children. Depending on the target age range, the level of realism may be varied. For instance, in preparation for transitioning to real musical instruments, a scaled down and lower fidelity device, but otherwise requiring the same instrumentation skills, may be appropriate. Alternatively, for younger children with whom the goal is to introduce the joys of playing music, the number of inputs/producible sounds may be greatly reduced, or a single input may be operative to produce a sequence of multiple sounds. Such devices can be driven by electronic synthesizers, which may be controlled by programmable data processors or integrated circuit devices.

Conventional amusement devices that allow the operator to produce or manipulate musical outputs and sounds are usually standalone units with limited possibilities for amalgamation with other sounds from different devices unless independently operated. Just as ensemble performances with real instruments can be more captivating and enjoyable than solo performances for some, such is likewise the case with simulated instruments and other amusement devices that output music. Accordingly, there is a need in the art for synchronized multiple device audio playback and interaction.

BRIEF SUMMARY

In accordance with one embodiment of the present disclosure, a musical playback system is contemplated. There may be a first interactive device with a primary audio track that can be defined by a plurality of time-sequenced audio data elements and associated synchronization identifiers loaded thereon. The first primary audio track may be played back on the first interactive device. Additionally, there may be a second interactive device with a secondary track loaded thereon. The second interactive device may be in communication with the first interactive device to receive playback synchronization commands that can coordinate play back of the secondary track on the second interactive device. The synchronization identifiers can be transmitted from the first interactive device to the second interactive device as the playback synchronization commands in coordination with the play back of the primary audio track.

Another embodiment of the present disclosure contemplates an interactive device. The interactive device may include an acoustic transducer, as well as a data communications transceiver linkable to a corresponding data communications transceiver on another interactive device to exchange data therewith. There may also be a memory with audio data stored thereon. The audio data may include a primary track and a secondary track, with each being respectively defined by a plurality of time-sequenced audio data elements with selected ones of the audio data elements linked to playback synchronization identifiers. The device may further include a programmable data processor that can be connected to the acoustic transducer, the data communications transceiver, and the memory. The data processor can be programmed to operate in one of a master mode and a secondary mode. In the master mode, the audio data elements of the primary track can be synthesized as a primary track audio signal to the acoustic transducer. Furthermore, linked ones of the playback synchronization identifiers can be passed to the data communications transceiver as the corresponding audio data elements are being synthesized at given time instants. In the secondary mode, the audio data elements of the secondary track can be synthesized as a secondary track audio signal to the acoustic transducer. Received playback synchronization identifiers from the data communications transceiver may designate particular time-sequenced audio data elements being synthesized at given time instants.

Yet another embodiment contemplates a method for synchronized audio output between a first device and a second device. The method may include a step of generating a first audio output corresponding to a primary track. The first audio output may be generated on the first device. Furthermore, the first audio output may correspond to a primary track that is defined by a plurality of sequential audio data elements and one or more first playback synchronization identifiers associated with specific audio data elements, at spaced intervals. There may also be a step of transmitting, to the second device, synchronization commands corresponding to the first playback synchronization identifiers. This may proceed as playback of the primary track on the first device adjusts to those specific audio data elements that include the associated first playback synchronization identifiers. The method may further include generating a second audio output of a first secondary track on the second device in synchrony with the first audio output on the first device. The first secondary track may be defined by a plurality of sequential audio data elements and one or more second playback synchronization identifiers associated with specific audio data elements at spaced intervals. Relative time instances of the first playback synchronization identifiers of the primary track and the second playback synchronization identifiers of the first secondary track may be substantially the same. Synchrony between the first device and the second device can be maintained with the transmitted synchronization commands. Playback of the second audio output may be adjusted to a specific one of the sequential audio data elements with the associated second synchronization identifiers as directed by the synchronization commands from the first device.

A method for synchronizing audio output between a first device with a first audio track and a second device with a second audio track is also contemplated. The first audio track and the second audio track may each be defined by a plurality of musical notes each in turn associated with a timestamp. The method may include generating on the first device a first audio output corresponding to a first one of the musical notes of the first audio track. There may be a step of transmitting a first timestamp that is associated with the first one of the musical notes to a second device as a synchronization timestamp. The method may further include generating, on the second device, a second audio output that can correspond to a first one of the musical notes of the second audio track. The received synchronization timestamp may further correspond to a second timestamp associated with the first one of the musical notes of the second audio track that is being generated as the second audio output.

The present invention will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which:

FIGS. 4A-4D are schematic diagrams of various electrical circuits specific to an interactive device simulating a cello or a marimba and utilizing an infrared data (IR) link modality;

FIGS. 5A-5C are schematic diagrams of circuits specific to the interactive device simulating a cello or a marimba and utilizing a radio frequency (RF) data link modality;

FIGS. 7A-7C are schematic diagrams of circuits specific to the interactive device simulating a drum or a conga and utilizing an RF data link modality;

FIGS. 9A-9B are schematic diagrams of circuits specific to the interactive device simulating a harp or a piano and utilizing an RF data link modality;

FIG. 10 is a truth table of the inputs to the programmable data processor to define an instrument variant of the particular interactive device;

Common reference numerals are used throughout the drawings and the detailed description to indicate the same elements.

DETAILED DESCRIPTION

The detailed description set forth below in connection with the appended drawings is intended as a description of the presently preferred embodiments of the invention, and is not intended to represent the only form in which the present invention may be constructed or utilized. The description sets forth the functions of the invention in connection with the illustrated embodiment. It is to be understood, however, that the same or equivalent functions and may be accomplished by different embodiments that are also intended to be encompassed within the scope of the present disclosure. It is further understood that the use of relational terms such as first and second and the like are used solely to distinguish one from another entity without necessarily requiring or implying any actual such relationship or order between such entities.

Figure 1:
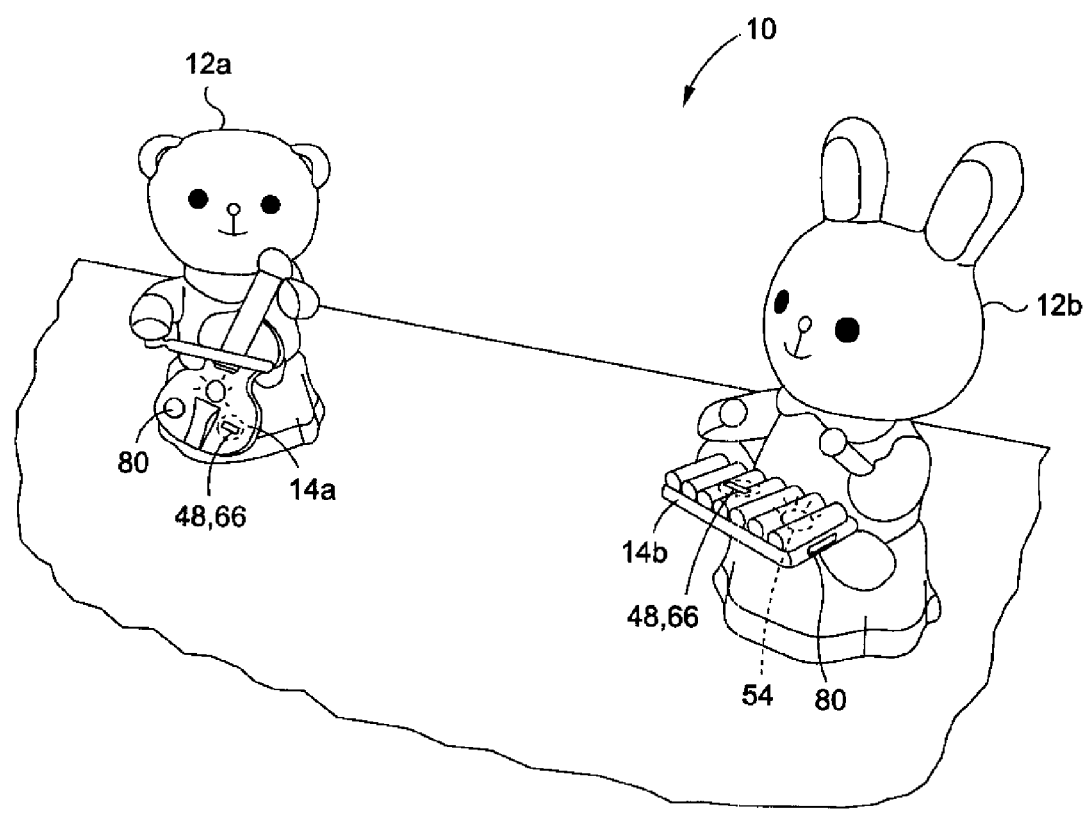
FIG. 1 is a perspective view of an audio playback amusement system including a first toy or interactive device and a second toy or interactive device.
Figure 2:
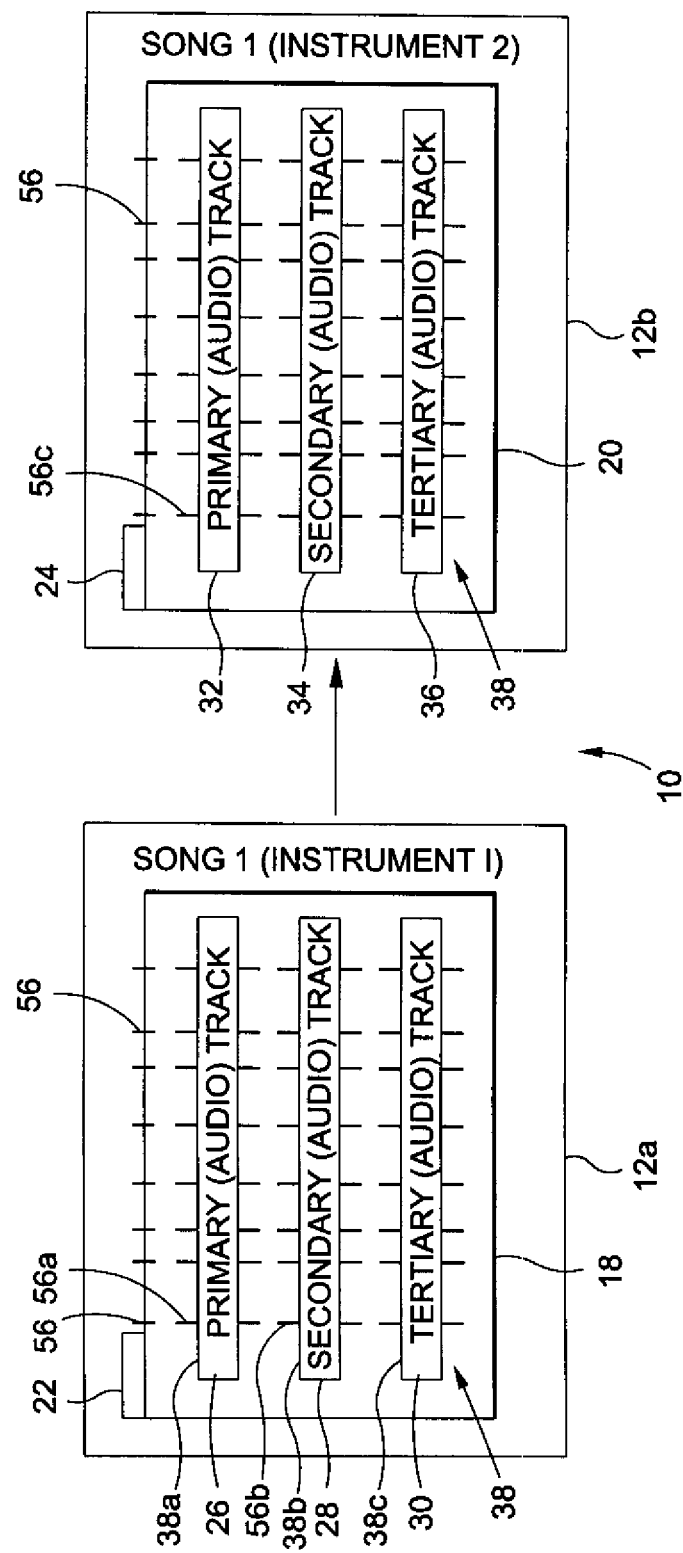
FIG. 2 is a block diagram of the audio playback amusement system generally illustrating the functional/logical components thereof.

With reference to FIG. 1 and to the block diagram of FIG. 2, various embodiments of the present disclosure contemplate an audio playback amusement system 10 in which multiple toys or interactive devices 12, including a first interactive device 12a and a second interactive device 12b, can synchronously play back audio such as music and speech. By way of example only and not of limitation, the first interactive device 12a has an outer appearance of an anthropomorphized bear figure playing a musical instrument 14a resembling a cello. Furthermore, the second interactive device 12b likewise has an outer appearance of an anthropomorphized animal, but as a rabbit playing yet another simulated musical instrument 14b, in this case, a marimba. As will be discussed in further detail below, the respective sounds generated by the first and second interactive devices 12 are contemplated to mimic those of the actual instruments.

Together with the auditory outputs, various embodiments also contemplate movement of limbs 16 of the anthropomorphized characters to simulate the playing of the instruments 14. For example, one of the limbs 16 of the first interactive device 12a may move from side to side to simulate the stroking of a bow across strings of the cello, while both of the limbs 16 of the second interactive device 12b may move up and down to simulate the striking motion of the mallets against the bars, as exerted by the character. Additionally, there may be various indicator devices that produce illumination in predetermined patterns. It will be recognized by those having ordinary skill in the art that such visual appearances are merely exemplary in nature, and any other suitable appearance may be substituted to match desired thematic characteristics.

In further detail as shown in the block diagram of FIG. 2, the first interactive device 12a includes a first audio sequence 18, and the second interactive device 12b includes a second audio sequence 20. In accordance with one embodiment, the first audio sequence 18 and the second audio sequence 20 are understood to comprise a single musical composition or a song. Therefore, the first audio sequence 18 and the second audio sequence 20 have the same length. Continuing with the previous example of the first interactive device 12a corresponding to a cello, the first audio sequence 18 is intended to represent that part of the composition as would be played on the cello. Along these lines, the second interactive device 12b may correspond to a marimba, and accordingly, the second audio sequence 20 is intended to represent that part of the composition as would be played on the marimba. As indicated above, the type of input stream is represented by the interactive devices 12 by way of example only, and any other suitable instrument may be substituted. With such alternative embodiments, the corresponding audio sequence thereof is understood to have acoustic characteristics that match those of the instrument being represented.

Although only one audio sequence is shown for each of the respective first and second interactive devices 12a, 12b for the sake of simplicity, it is expressly contemplated that many different songs can be loaded thereon. In order to identify the particular audio sequence among other available ones, the first audio sequence 18 may have a first audio sequence identifier 22, and the second audio sequence 20 may have a second audio sequence identifier 24. So that the respective first and second audio sequences 18, 20 can be played back synchronously as the single composition, both of the values of the first audio sequence identifier 22 and the second audio sequence identifier 24 are understood to be the same. Other sets of audio sequences for different compositions may have identical audio sequence identifier values.

Each of the audio sequences is segregated into multiple tracks. For instance, the first audio sequence 18 includes a primary track 26, a secondary track 28, and a tertiary track 30. Along these lines, the second audio sequence 20 likewise includes a primary track 32, a secondary track 34, and a tertiary track 36. The individual tracks may represent different parts of the composition as would be played on a single instrument, including the melody, harmony, accompaniment, solo, and/or riff parts. Thus, the primary tracks 26, 32 may correspond to the melody portion, the secondary tracks 28, 34 may correspond to the accompaniment or harmony portion, and the tertiary tracks 30, 36 may correspond to a solo or a riff portion. All, some, or just one of these tracks may be selectively played back or generated as an audio output in accordance with various embodiments of the present disclosure. It is expressly contemplated that the interactive device 12 may include more than one secondary track and/or more than one tertiary track, notwithstanding the exemplary implementation shown in FIG. 2 where there is only one of each. Different selection modalities that can be manipulated by the user are possible, similar to those for other settings as will be described more fully below. When the term "track" is referenced, as in the primary track 32, the secondary track 34, and so forth, it is understood to refer to an audio track; the terms "audio track" and "track" are thus interchangeable.

Each of the tracks is further segregated into multiple audio sequence data elements 38. One possible implementation of the audio playback amusement system 10 may utilize MIDI (Musical Instrument Data Interface) sequence data to represent the musical composition. Each audio sequence data element 38 is understood to have a specific pitch or output signal frequency and correspond to a compositional note. For example, the numerical value 69 may correspond to an audio frequency of 440 Hz, or the "A4" note. Additional data such as clock/sequence identifiers to define a tempo can be included. The exact current playback position among the respective audio sequences 18, 20 may be indicated by a sequence identifier that is a timestamp or time code. Alternatively, the audio sequence data elements 38 may be raw pulse code modulated (PCM) data representative of audio signals. A common format for such audio data is Waveform Audio File Format (WAVE), though others such as AIFF (Audio Interchange File Format) may also be utilized. Although the amount of data may vary between a MIDI audio sequence and a WAVE audio sequence, audio data in general is oftentimes stored as a stream of time-sequenced information "chunks" to which metadata can be attached at particular time instances. In this regard, compressed, lossy audio data formals such as MP3 (MPEG2 Audio Layer 3) may also be utilized.

Figure 3:
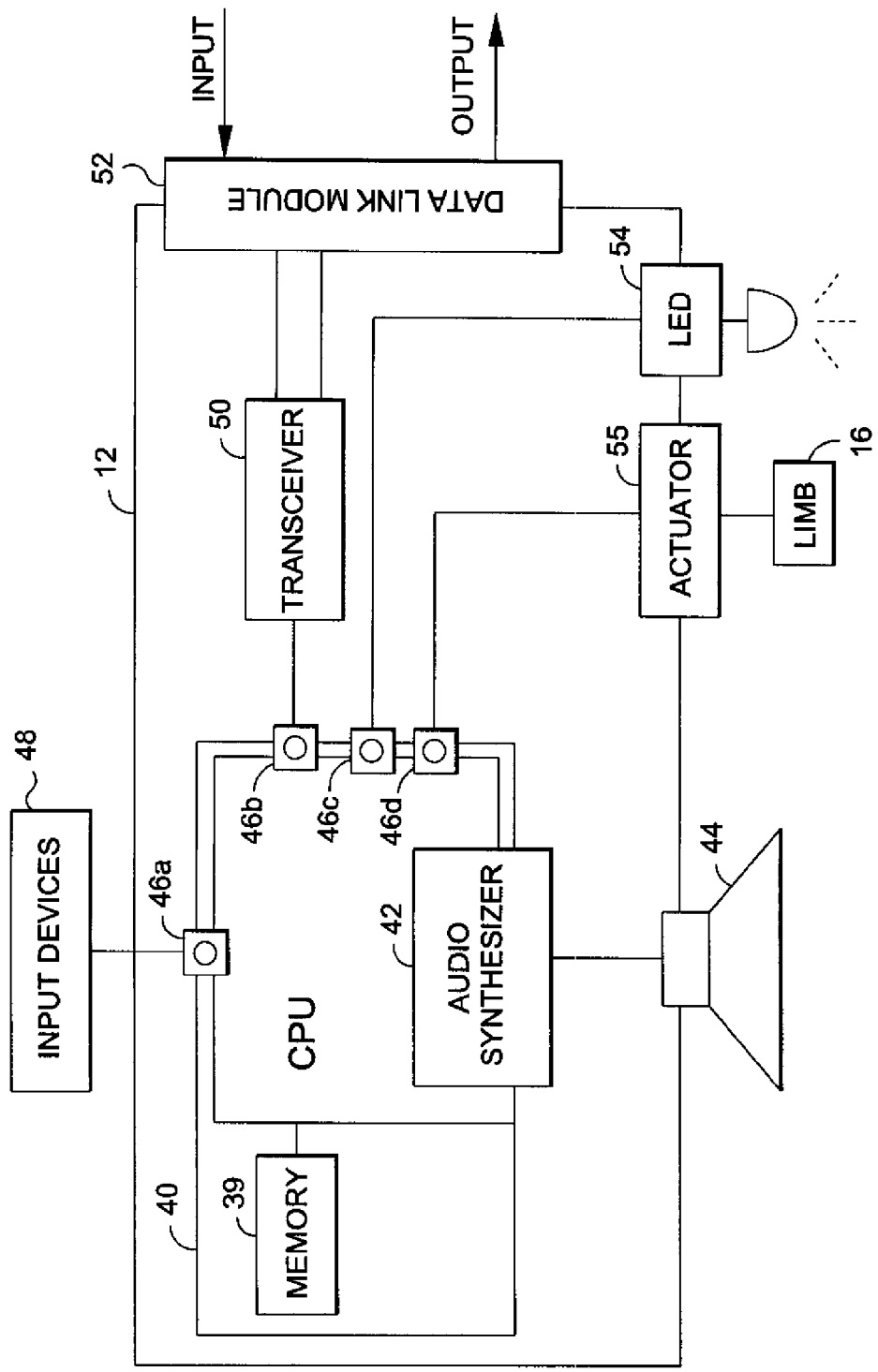
FIG. 3 is a more detailed block diagram showing the various electrical and electromechanical components of one of the interactive devices.

The block diagram of FIG. 3 illustrates additional details pertaining to an exemplary embodiment of the interactive device 12. The aforementioned audio sequence data is stored in a memory 39, which is connected to a programmable data processor 40 that can be configured to execute various sequences of instructions that embody the contemplated methods of the present disclosure. The memory 39, along with some of the other components of the interactive device 12, can be incorporated into the integrated circuit comprising the programmable data processor 40.

In addition to the memory 39, there may also be an on-board audio synthesizer module 42 that converts the audio sequence data in the order and speed designated into an audio output. The generated analog audio signal may be amplified and passed to an acoustic transducer 44 or loudspeaker, where it is mechanically reproduced as sound waves. The synthesizer module 42 can be programmed to generate sound signals that mimic those of a particular instrument, and so the tracks may include instrument identifiers specifying the aforementioned cello or marimba, or others such as the piano, harp, flute, trumpet, bells, and congas that can produce musical scales. Additionally, indefinite pitch percussive instruments such as the snare drum may also be specified. Besides reproducing the sounds corresponding to the audio sequence data, the synthesizer module 42 may accept text data, from which speech may be synthesized. In accordance with one embodiment of the present disclosure, the programmable data processor 40 can be the 24-channel MIDI/Speech Controller integrated circuit SNC88681A from Sonix Technology Co., Ltd. of Chupei City, Taiwan.

The programmable data processor 40 has several input/output ports 46 to which various peripheral devices may be connected. Although specific functional details of these peripheral devices as pertaining to the functionality of the interactive device 12 and the audio playback amusement system 10 on a broader level will be discussed more fully below, by way of general overview, these include an input device 48, a transceiver 50, a data link modality/front end 52, an illumination output device or Light Emitting Diodes (LED) 54, and a mechanical actuator 55. Because not all interactive devices 12 in the audio playback amusement system 10 require movement, the mechanical actuator 55 is optional. In further detail, the input device 48 may be connected to a first input/output port 46a, and the transceiver 50 may be connected to an input/output port 46b. The transceiver 50, in turn, is connected to the data link modality or front end 52. Connected to a third input/output port 46c is the LED 54, and connected to a fourth input/output port 46d is the mechanical actuator 55.

Various embodiments of the present disclosure contemplate a data communications link being established between the first interactive device 12a and the second interactive device 12b, and possibly others. The physical layer of the data communications link may be wired or wireless. It is understood that the transceiver 50 incorporates the pertinent data received from the programmable data processor 40 into a suitable data transmission packet that conforms to such standards as RS-485, RS-232, and so forth. The data link modality 52 converts the individual bits of the data transmission packet into corresponding signals that can be received and converted by the receiving data link modality 52 on another interactive device 12. One possible data link modality 52 is infrared (IR), while another is radio frequency (RF). Other data link modalities 52 such as optical signals, inaudible sounds or tones, Bluetooth, WiFi, ZigBee, and so forth may also be utilized. Those having ordinary skill in the art will recognize that any other suitable data link modality may be substituted without departing from the scope of the present disclosure.

Having generally described the components of the interactive device 12, additional details pertaining to several exemplary implementations will now be considered with reference to the circuit diagrams of FIGS. 4A-4D, 5A-5C, 6A-6C, 7A-7C, 8A-8B, and 9A-9B. As mentioned above, the audio playback amusement system 10 may include several interactive devices 12 that simulate different instruments. More particularly, the circuit diagrams of FIGS. 4A-4D and 5A-5C depict those circuit elements particular to an implementation of the interactive device 12 for simulating a cello or a marimba, while the circuit diagrams of FIGS. 6A-6C and 7A-7C are particular to a drum or conga implementation. Furthermore, the circuit diagrams of FIGS. 8A-8B and 9A-9B are intended to be specific to interactive devices 12 that simulate a piano or a harp.

In all embodiments, the aforementioned programmable data processor 40 is utilized to control the various peripheral devices connected thereto. Along these lines, each embodiment may utilize the same clock/crystal circuits 41 and power connections 43. Additionally, as explained previously, audio signals are synthesized by an on-board synthesizer that is in turn connected to the acoustic transducer 44 or loudspeaker. In embodiments where the interactive device 12 may move the limbs 16 of the depicted characters such as with the cello or marimba, a motor driver circuit that boosts the control signal from the programmable data processor 40 and isolates potential voltage and current spikes from the actuator 55 may be included.

The transceiver 50 of the interactive device may be implemented with various input/output ports, with the programmable data processor 40 being provided with instructions that implement the basic functionality thereof. In embodiments where infrared communications is utilized, the generated transmission signals from the programmable data processor 40 is passed to an infrared-wavelength light emitting diode circuit 58 shown in FIGS. 4B, 6B, and 8B. Reception of remote infrared signals is achieved with a reception circuit 60 that is connected to the programmable data processor 40. Those having ordinary skill in the art will recognize alternative IR transmission and reception circuits, and the ones described herein are presented by way of example only and not of limitation.

With reference to the schematic diagram of FIGS. 5B, 7B, and 9B, a separate radio frequency (RF) transceiver 51 may be utilized for data communications between the interactive devices 12. The data to be transmitted is passed directly from the programmable data processor 40 to the RF transceiver 51, where a corresponding RF signal is generated and broadcast via an antenna 62. RF signals received from the other RF transceivers 51 are also received via the antenna 62 and converted to data that can be parsed by the programmable data processor 40. As will be recognized, the RF transceiver typically requires its own clock circuit 64 in the transmit/receive frequency range. According to one embodiment, this frequency is in the unlicensed Industrial-Scientific-Mobile (ISM) band of 2.4 GHz, though any other suitable frequency band may be substituted. In order to carry on communications amongst a single audio playback amusement system 10, each interactive device 12 therein, and thus the clock circuit 64 thereof has the same operating frequency.

In one embodiment, the LEDs 54 are utilized to indicate the status of the data link between the interactive device 12 and others. A first LED 54a may be colored red to indicate that a connection with any other interactive device 12 has not been established, while a second LED 54b may be colored green to indicate that a connection has been established. The LEDs 54 may be selectively activated or flashed to indicate various operating modes and status conditions of the interactive device 12.

Figure 4A:
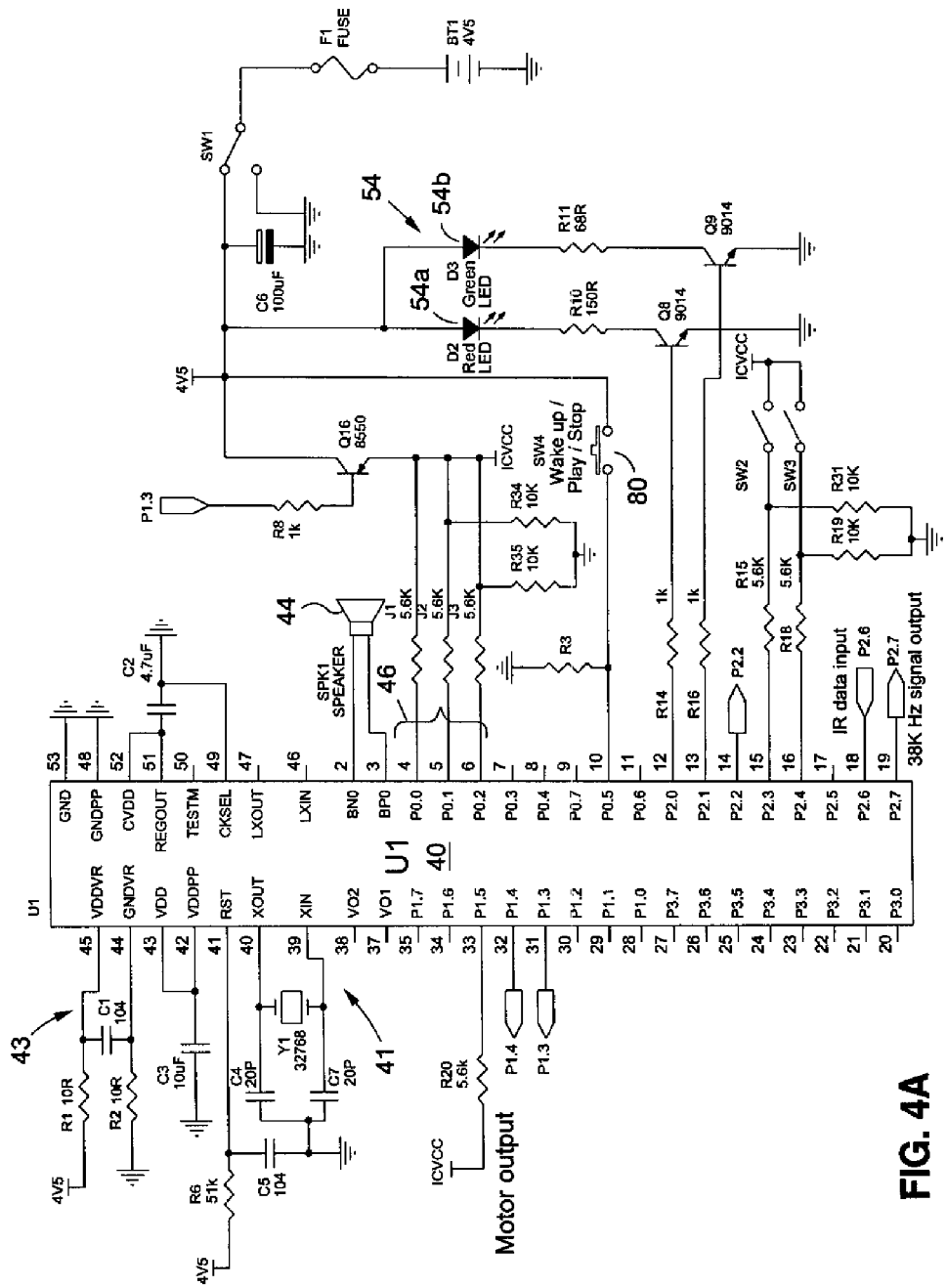
Figure 5A:
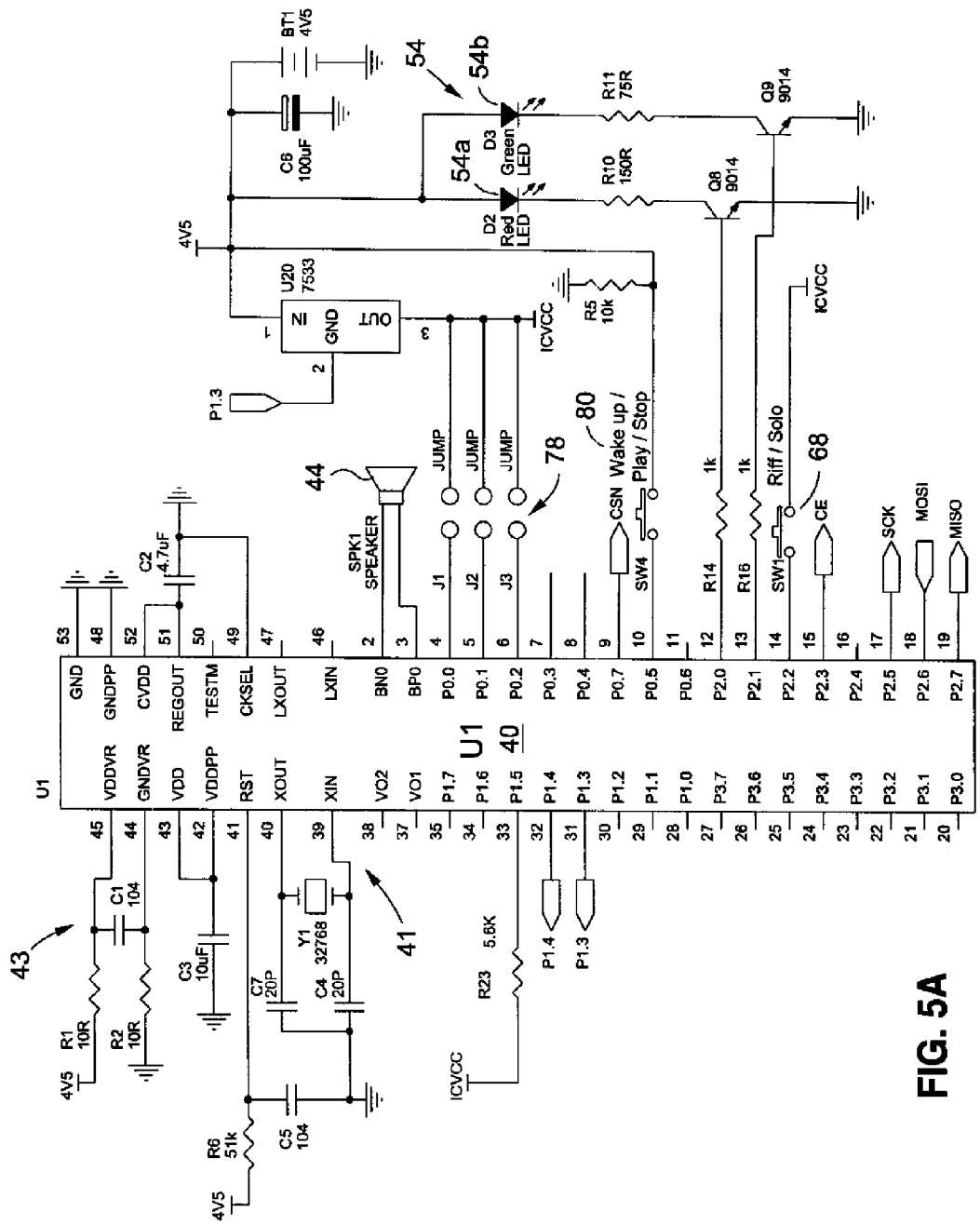
Figure 6A:
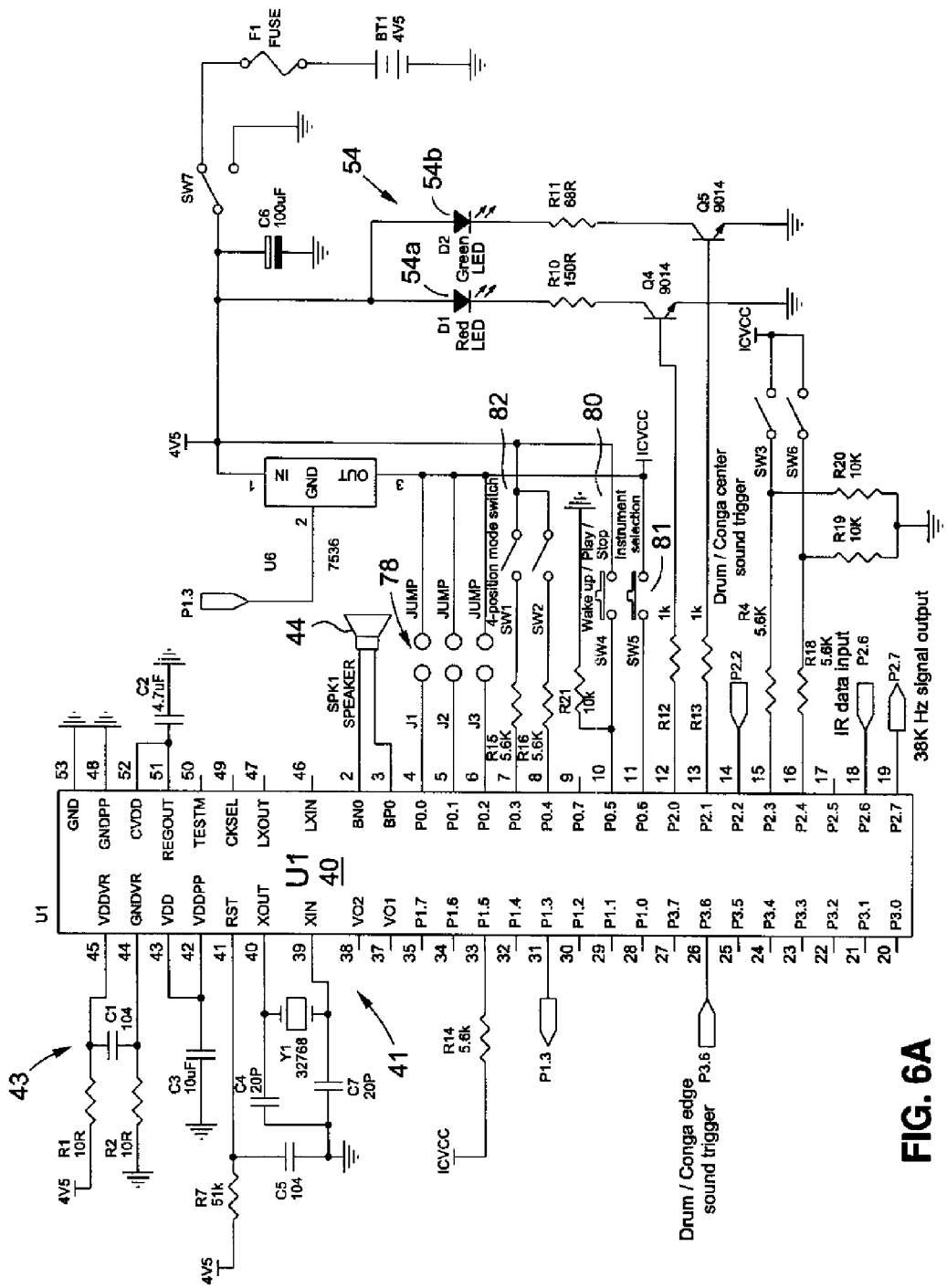
FIGS. 6A-6C are schematic diagrams of circuits specific to the interactive device simulating a drum or a conga and utilizing an IR data link modality.
Figures 6B, 6C:
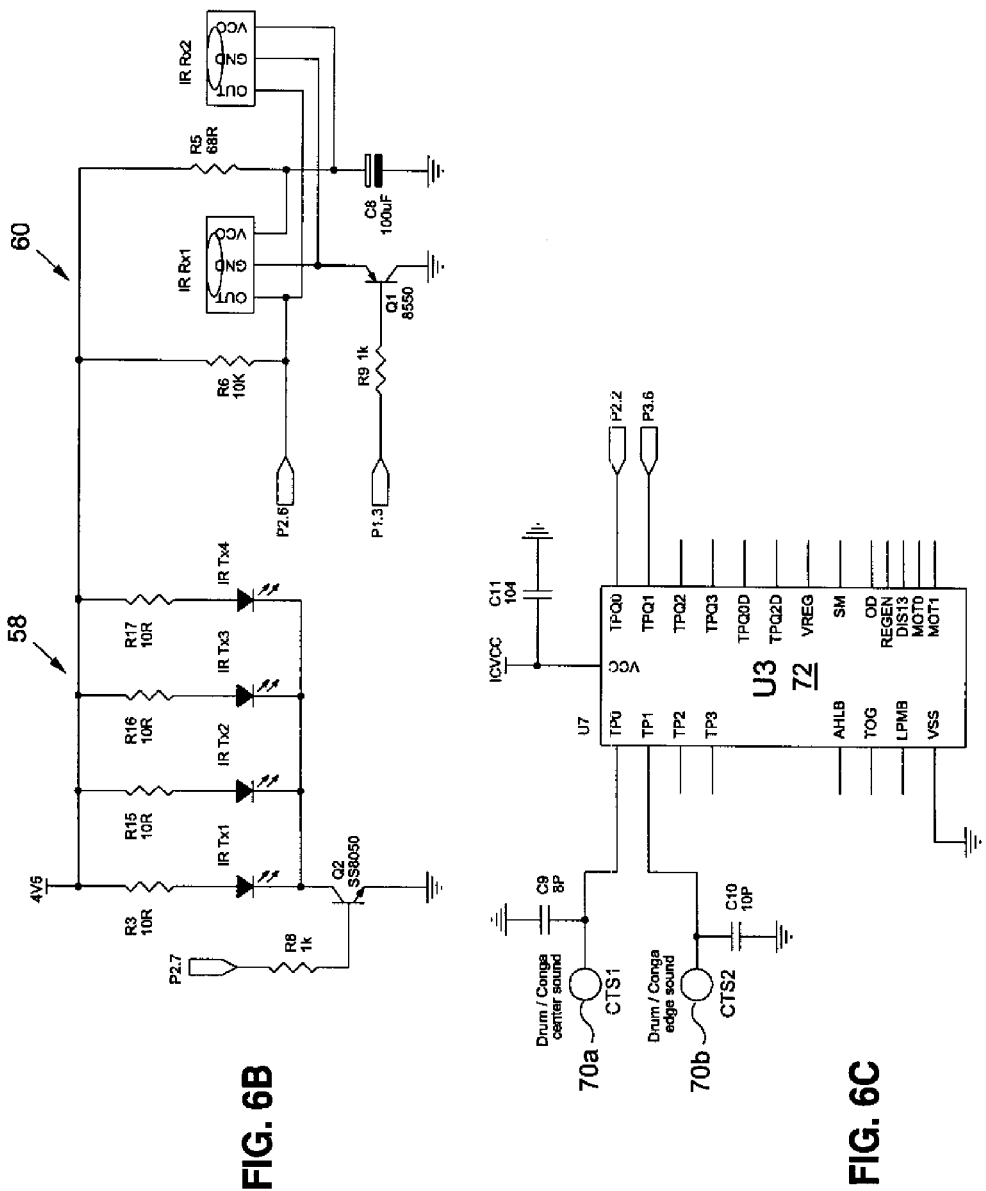
Figure 7A:
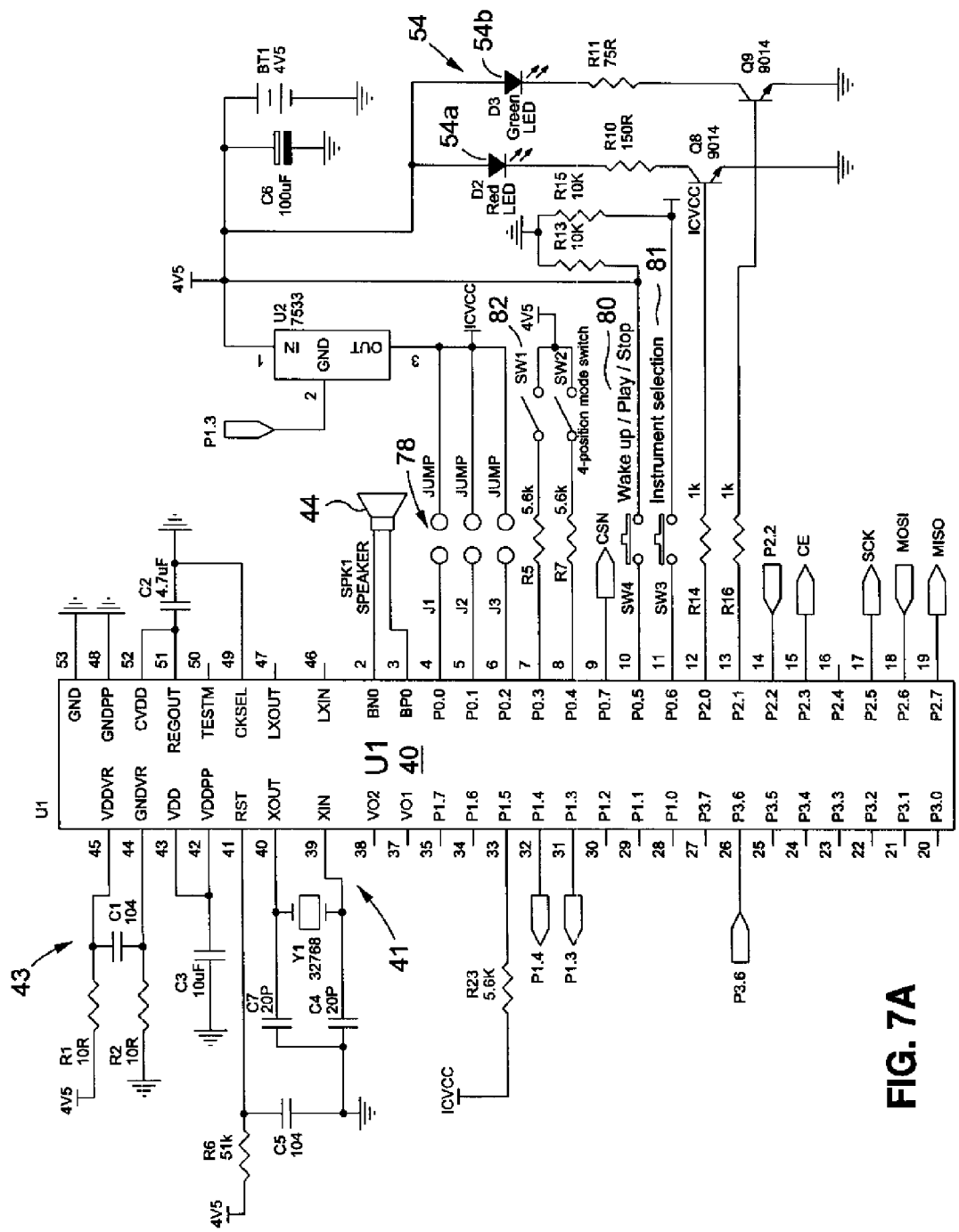
Figure 11:
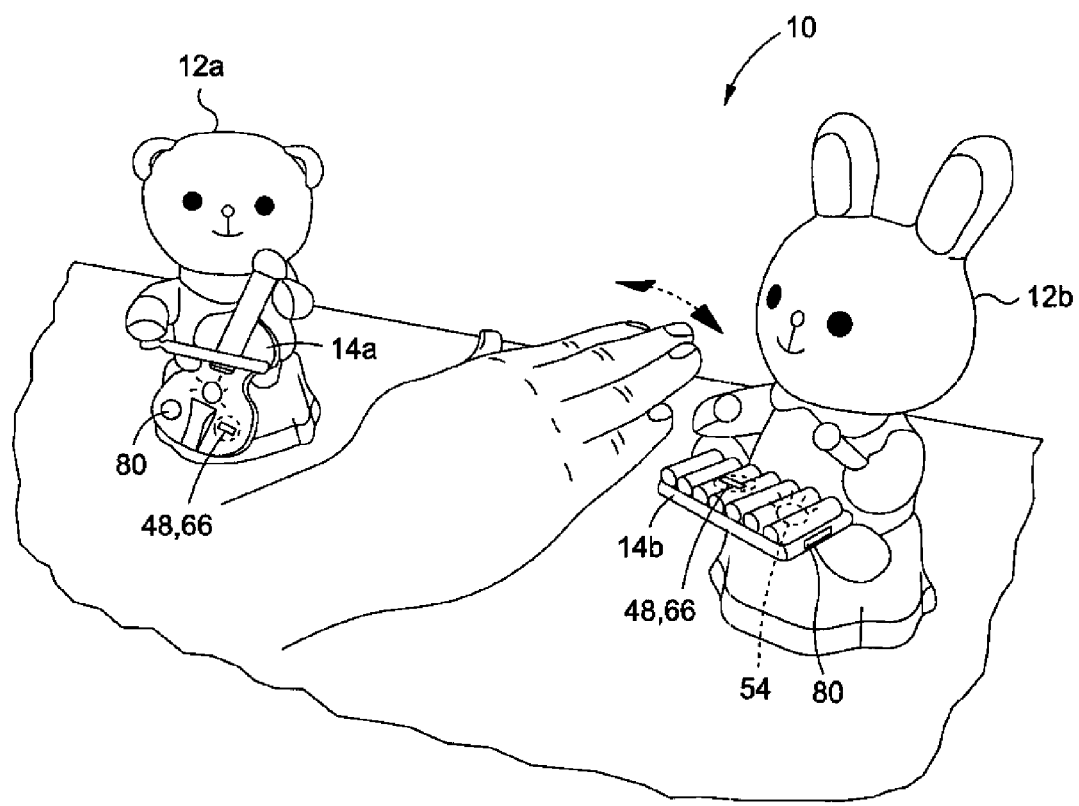
FIG. 11 is a perspective view of the audio playback amusement system in which user input is being provided to one of the interactive devices to manipulate its operation in a manner specific to that of a cello or marimba instrument.

As mentioned above, the audio playback amusement system 10 may include several interactive devices 12 that simulate different instruments. In this regard, the kind of inputs that can be provided to the interactive device 12 via the input device 48 to alter the playback of the audio sequences may vary depending upon the specifics of the simulated instrument. In one example, it may be the most intuitive to sweep a hand from side to side, as contemplated for a cello or a marimba. In this case, the input device 48 shown in FIG. 4D may be an infrared proximity sensor 66 that generates one signal to the programmable data processor 40 when there is an obstruction that reflects back the transmitted light to a sensor element, and another signal when there is no obstruction. In some cases, multiple sensor elements and signal sources may be combined to detect directional movement. The example interaction shown in FIG. 11 illustrates the hand being waved over the proximity sensor 66 to provide a user input. Alternatively, a mechanically actuated switch 68 may be utilized as shown in FIG. 5A. Further details on the use of such received user input will be discussed more fully below.

Figure 12:
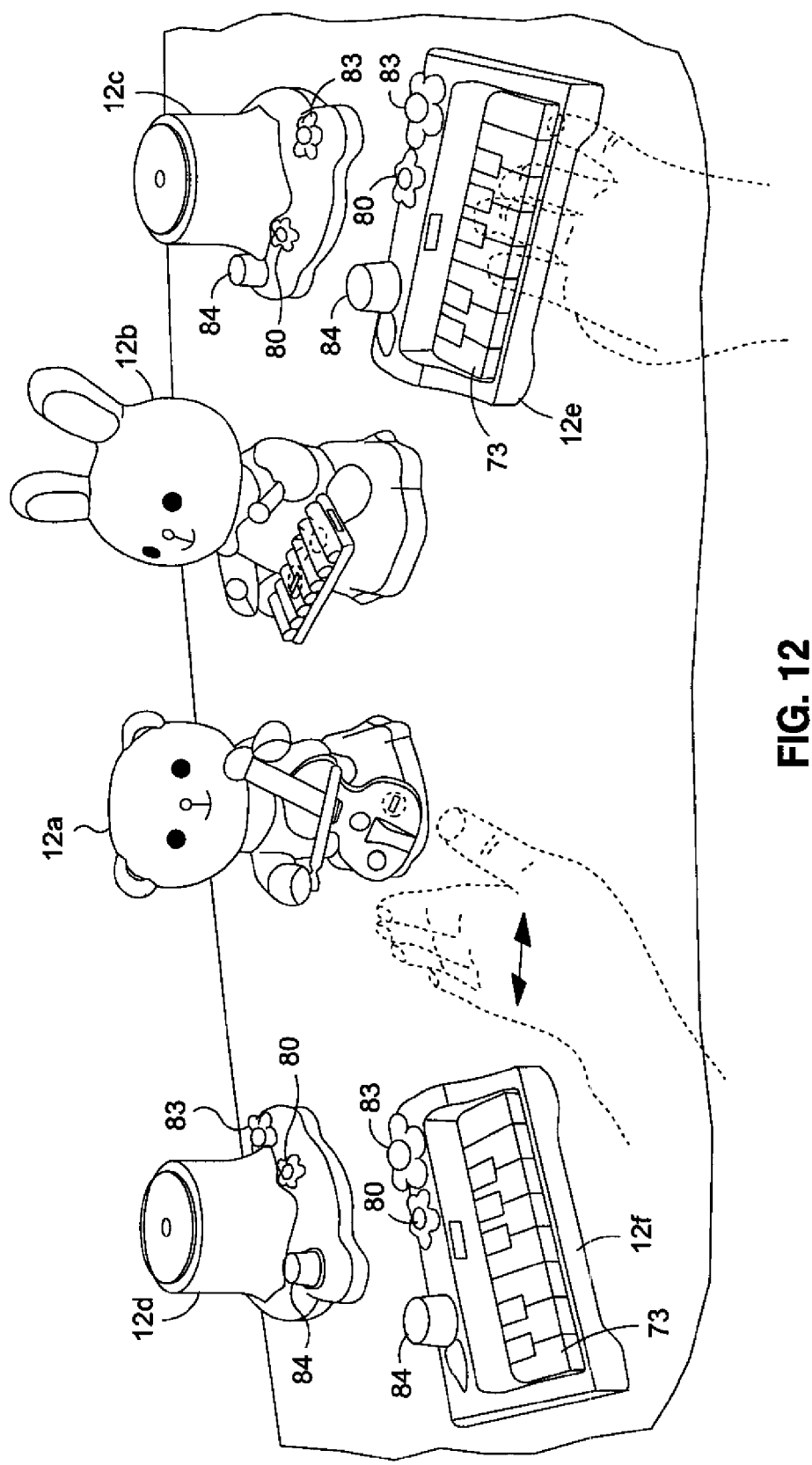
FIG. 12 is a perspective view of the audio playback amusement system in which user input is being provided to a first one of the interactive devices to manipulate its operation in a manner specific to that of a piano, a second one of the interactive devices to manipulate its operation in a manner specific to that of a cello.

To simulate a percussion instrument such as a conga or a drum, it may be most appropriate to receive an actual strike from the user's hand upon a striking surface. With reference to the schematic diagram of FIGS. 6C and 7C, the interactive device 12 may include a first capacitive touch sensor 70a that when activated, generates a sound corresponding to a strike upon the center of the instrument, and a second capacitive touch sensor 70b that when activated, generates a sound corresponding a strike upon the edge or outer rim of the same. When both the first capacitive touch sensor 70a and the second capacitive touch sensor 70b are activated at once, then a further different sound may be generated. Sounds produced by any strikes are detected and passed to a touch sensor circuit 72 that provides the digital data (a binary 0 or 1) to the programmable data processor 40 for further handling. An example of such an interactive device is shown in FIG. 12, which includes the first interactive device 12a simulating the cello, the second interactive device 12b simulating the marimba, and a third interactive device 12c and a fourth interactive device 12d simulating the drum or conga.

Figure 8A:
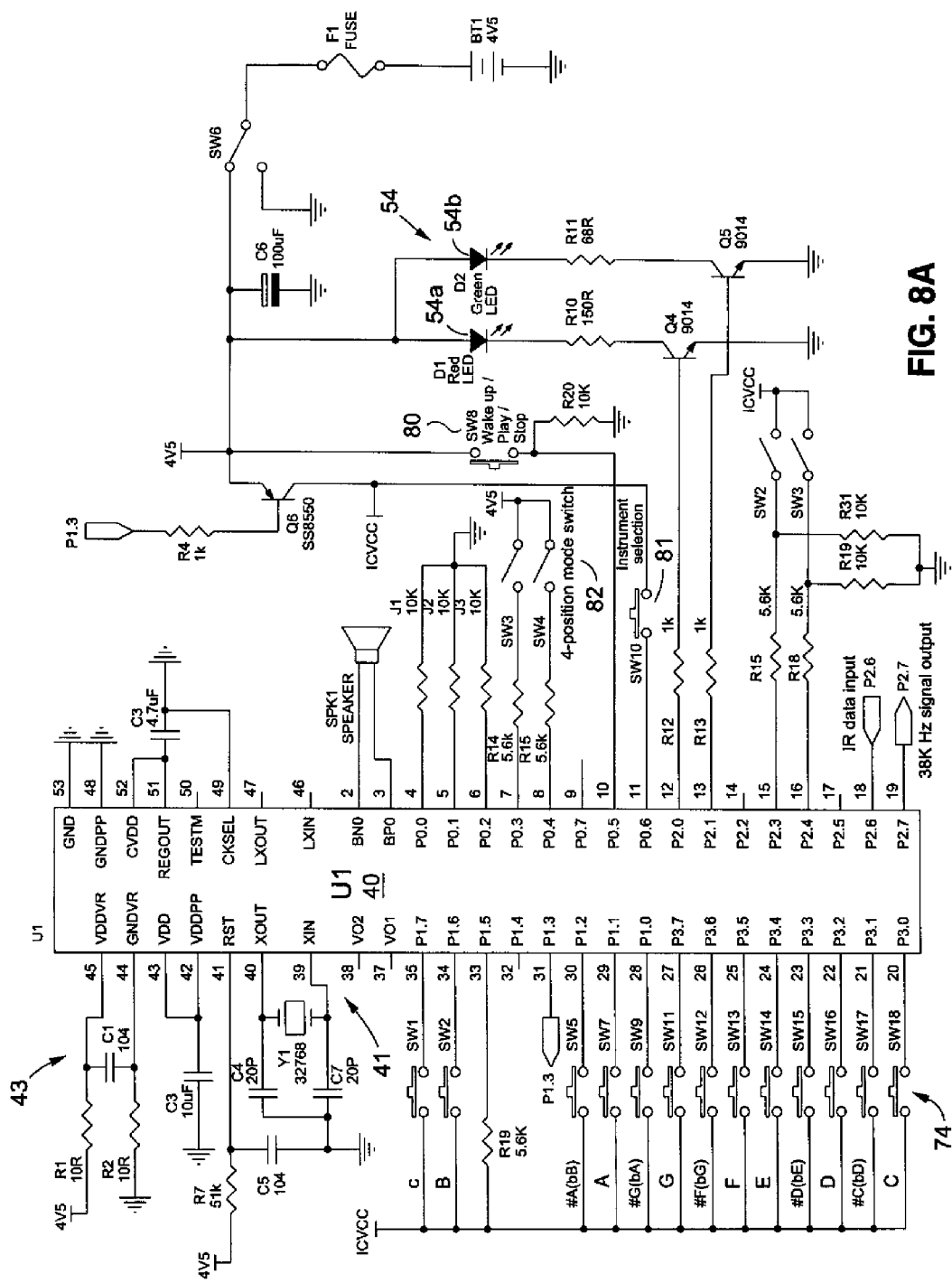
FIGS. 8A-8B are schematic diagrams of circuits specific to the interactive device simulating a harp or a piano and utilizing an IR data link modality.
Figure 8B:
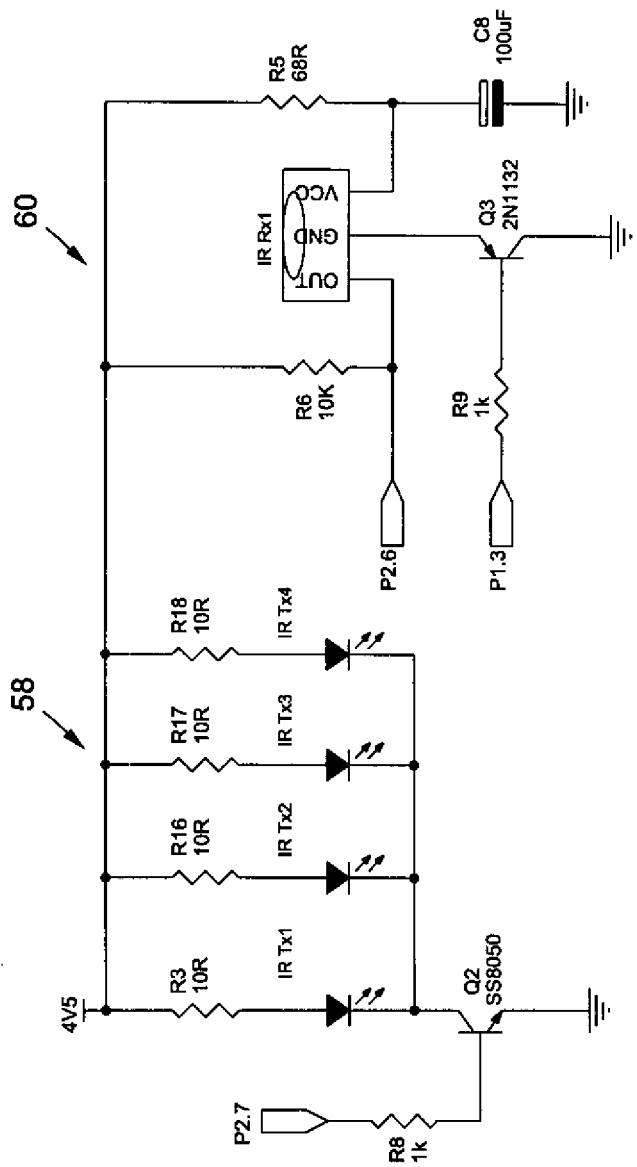
Figure 9A:
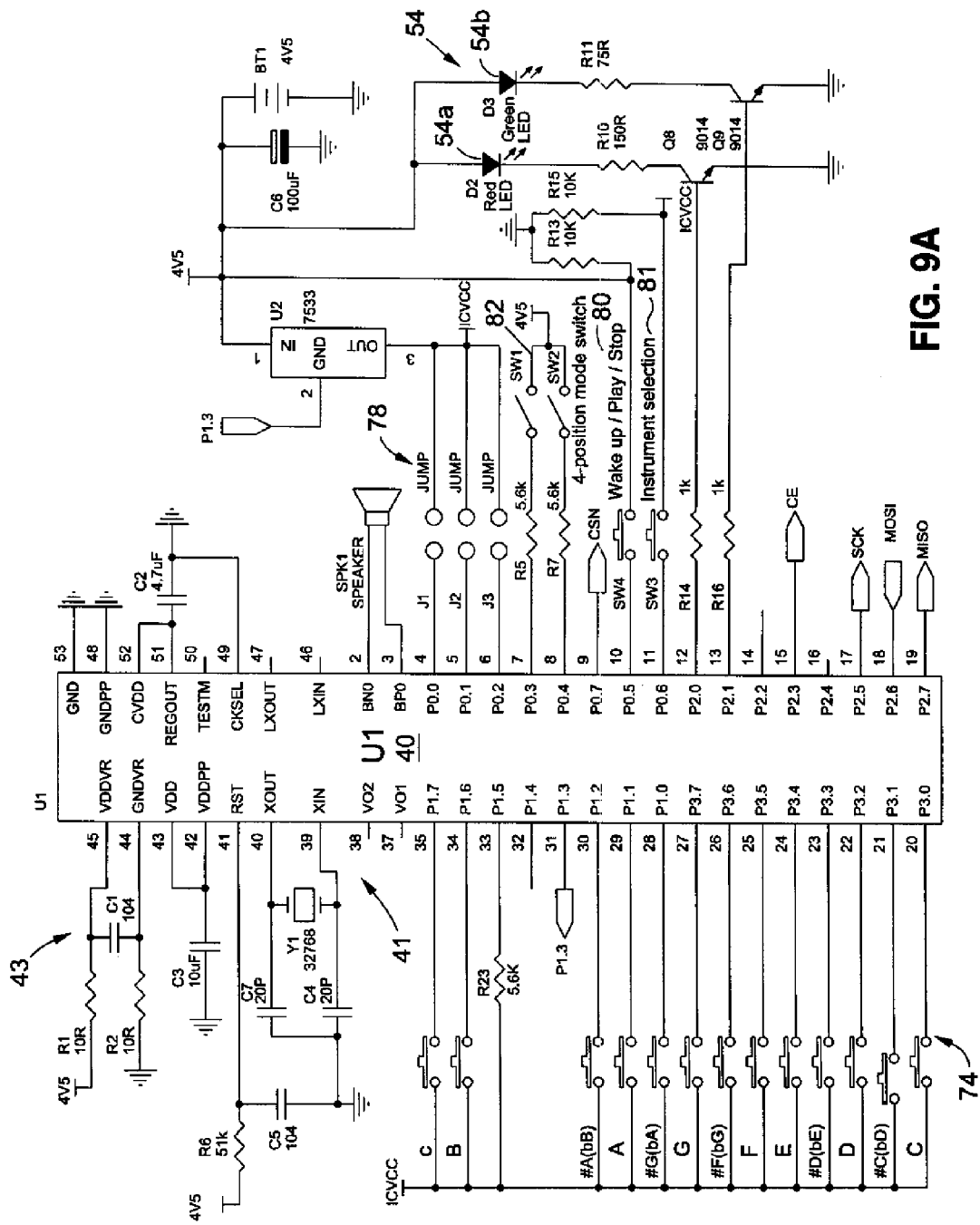

For keyboard-type instruments with which it is possible to produce multiple notes, a series of inputs each representative of a particular note may be the most suitable. FIGS. 8A and 9A are schematic diagrams of an interactive device 12 that simulates the piano or the harp, for example. The example embodiment shown in FIG. 12 also features a fifth interactive device 12e and a sixth interactive device 12f simulating the piano or the harp. Connected to the programmable data processor 40 are multiple momentary activation switches 74 that simulate notes ranging between "C" and "A#." The individual keys 73 in the fifth and sixth interactive devices 12e, 12f are connected to the respective momentary activation switches 74. It is possible for the programmable data processor 40 to utilize just one input note to generate a specific response. However, just as with the actual instrument, multiple input note combinations or sequences of combinations can also be utilized to generate specific responses.

As can be appreciated from the foregoing description of the numerous variations of the interactive device 12, each shares several similarities, including the programmable data processor 40. In order to streamline the manufacturing process, a single software program can be written to cover all functions of such variations. In order to differentiate one variation from another, at the time of manufacture, data inputs to the programmable data processor 40 representative of specific variant of that particular interactive device 12 may be provided.

By way of example only, a truth table 76 of FIG. 10 lists possible binary values that can be input to three of the input ports of the programmable data processor. A first row 76a shows a binary "000" corresponding to a piano/harp type variant, second row 76b shows a binary "001" value corresponding to a cello, a third row 76c shows a binary "010" value corresponding to a drum or a conga, and a fourth row 76d shows a binary "011" value corresponding to a marimba. Some embodiments may set this value permanently at the time of manufacture, and as shown in FIG. 4A, where port 0.0 is tied to VCC (high), port 0.1 is tied to ground (low), and port 0.2 is tied to ground (low). FIG. 8A illustrates another permanent setting where all ports 0.0, 0.1, and 0.2 are tied to ground (low). Alternatively, as shown in FIG. 5A, 6A, 7A, and 9A, a set of jumpers 78 may allow the selective connection of high and low to define the variant inputs to the programmable data processor 40.

Some entries of the truth table 76 show that some inputs may correspond to two different variations of instruments. For example, in the first row 76a, the binary value "000" may correspond to either a piano or a harp. Furthermore, in the third row 76c, the binary value "010" may correspond to either a drum or a conga. Since the interactive device 12 functions differently and require different audio synthesis although being categorically the same, a selection modality thereof is also contemplated. With reference to the schematic diagrams of FIGS. 6A, 7A, 8A, and 9A, there is an instrument selection switch 81 that sets which of the two possible instruments that can be simulated. In an exemplary implementation, such multi-instrument interactive devices 12c, 12d and 12e, 12f include an instrument selection button 83 that manipulates the instrument selection switch 81.

Referring back to the block diagram of FIG. 2, both the first audio sequence 18 and the second audio sequence 20 each include track section identifiers 56 associated with certain audio sequence data elements 38 over spaced intervals. That is, the track section identifiers 56 are linked to or otherwise reference specific audio sequence data elements 38. The intervals can be varied depending on the specifics of the song or composition as shown. However, there are also contemplated embodiments where the spacing interval is consistent throughout. In a given audio sequence 18, 20, the track section identifiers 56 of each of the respective primary track 26, 32, secondary track 28, 34, and tertiary track 30, 36, is understood to reference the same specific time instance or ordered sequence number. For example, the primary track 26 may have an audio sequence data element 38a that corresponds to one instance in time when the corresponding audio data therein is synthesized, and the secondary track 28 may have another audio sequence data element 38b that corresponds to the same instance in time when its corresponding audio data is synthesized. Both of the audio sequence data elements 38a, 38b are intended to be played back at the same time instance, and the respective identifier 56a of the primary track 26 and the second identifier 56b of the secondary track 28 refer to that same time instance. The track section identifiers 56 may be referred to by different terms such as playback synchronization identifiers, synchronization identifiers, timestamps, markers, and the like, but it is understood that all such terms generally contemplate any indicator to a particular audio sequence data element 38 that can be used to retrieve, process, or otherwise identify it.

Where the second audio sequence 20 on the second interactive device 12b is the same composition, then the track section identifiers 56 of the respective primary, secondary, and tertiary tracks are also understood to reference the same relative time instance or order sequence number within the overall song. Thus, a third identifier 56c on the primary track 32 of the second audio sequence 20 that references the first audio sequence data element 38c corresponds to the same time instances as that referenced by the first identifier 56a on the primary track 26 of the first audio sequence 18 that references the time-wise identical first audio sequence data element 38a. In some cases, such as when the MIDI format is utilized, there are no separate identifiers 56 for each of the respective tracks 38*a*-38*c*, and a single set that applies to all tracks is envisioned. Where alternative formats such as WAV or MP3 is involved, each separate track may have its own identifiers 56 as in the manner discussed above.

While in some implementations, the order of operations is such that the transmission of the synchronization command occurs after playback the corresponding audio sequence data element, it need not be limited thereto. In some cases where the transmission is fast enough, real-time playback synchronization may be possible regardless of the order in which the operations are executed. Where the transmission speed and the speed at which the programmable data processor 40 responds to the instructions to generate such transmissions may be less than ideal, playback may be delayed with the transmission of the synchronization command occurring substantially simultaneously, or even before playback of a particular audio sequence data element. Thus, to account for inherent time delays associated with generating and propagating the synchronization command, in actual implementation, the track section identifiers 56 may be processed independently of the audio sequence data element 38. In other words, the track section identifiers 56 may be processed and transmitted to the second interactive device 12*b* before playback of the corresponding audio sequence data element 38 occurs. The delay between these two events may be preset, or adjusted depending on the quality of the data link.

Various embodiments of the present disclosure contemplate the exchange of such track section identifiers 56 to synchronously play back the first audio sequence 18 and the second audio sequence 20 on the respective first and second interactive devices 12. More particularly, as transmitted by one interactive device 12, the track section identifier 56 may be referred to as a synchronization command that adjusts, by either advancing to or retreating from the playback of the audio sequence of the receiving interactive device 12 to that specific audio sequence data element 38 specified thereby.

As indicated above, the primary track represents a melody portion of the composition, while the secondary track represents an accompaniment or harmony portion of the composition. Thus, the first interactive device 12*a* may play back the melody in one simulated instrument, while the second interactive device 12*b* may play back the harmony or accompaniment in another simulated instrument different from the first. A rich musical experience is possible, with multiple instruments each playing, synchronously, a different part of the composition. Further enhancement of the user experience is also contemplated with the selective activation of solo, riff or tertiary tracks based on inputs received from the user via the respective input devices 48. This is also understood to be synchronized to the other tracks that are being actively played.

Generally, synchronization between entities is predicated on the setting of one entity as a primary or master and another entity as a secondary, with certain values of the primary being applied to the secondary. In an example embodiment of the audio playback amusement system 10, the first interactive device 12*a* may be designated the primary, while the second interactive device 12*b* may be designated the secondary. All interactive devices 12 in the audio playback amusement system 10 can function as either the primary or the secondary, and as a consequence, each of the programmable data processor 40 thereof can be said to have a primary or master mode and a secondary mode. In the primary mode, certain functions are performed by the programmable data processor 40, while in the secondary mode, certain other functions not necessarily the same as those of the primary mode are performed.

As the first interactive device 12*a* plays back the primary track 26, the track section identifiers 56 are encountered and processed. More particularly, the track section identifiers 56 are transmitted to the second interactive device 12*b* as a synchronization command. Upon receipt, the synchronization command sets the current playback position on the second interactive device 12*b* with respect to the secondary track 34. Any subsequent interactive device 12 that begins communicating with the primary becomes secondary thereto, and similarly receives synchronization commands that set the current playback position of a secondary track stored thereon to be in synchrony with the playback of the primary track 26 on the first interactive device 12*a*.

Figure 13A:
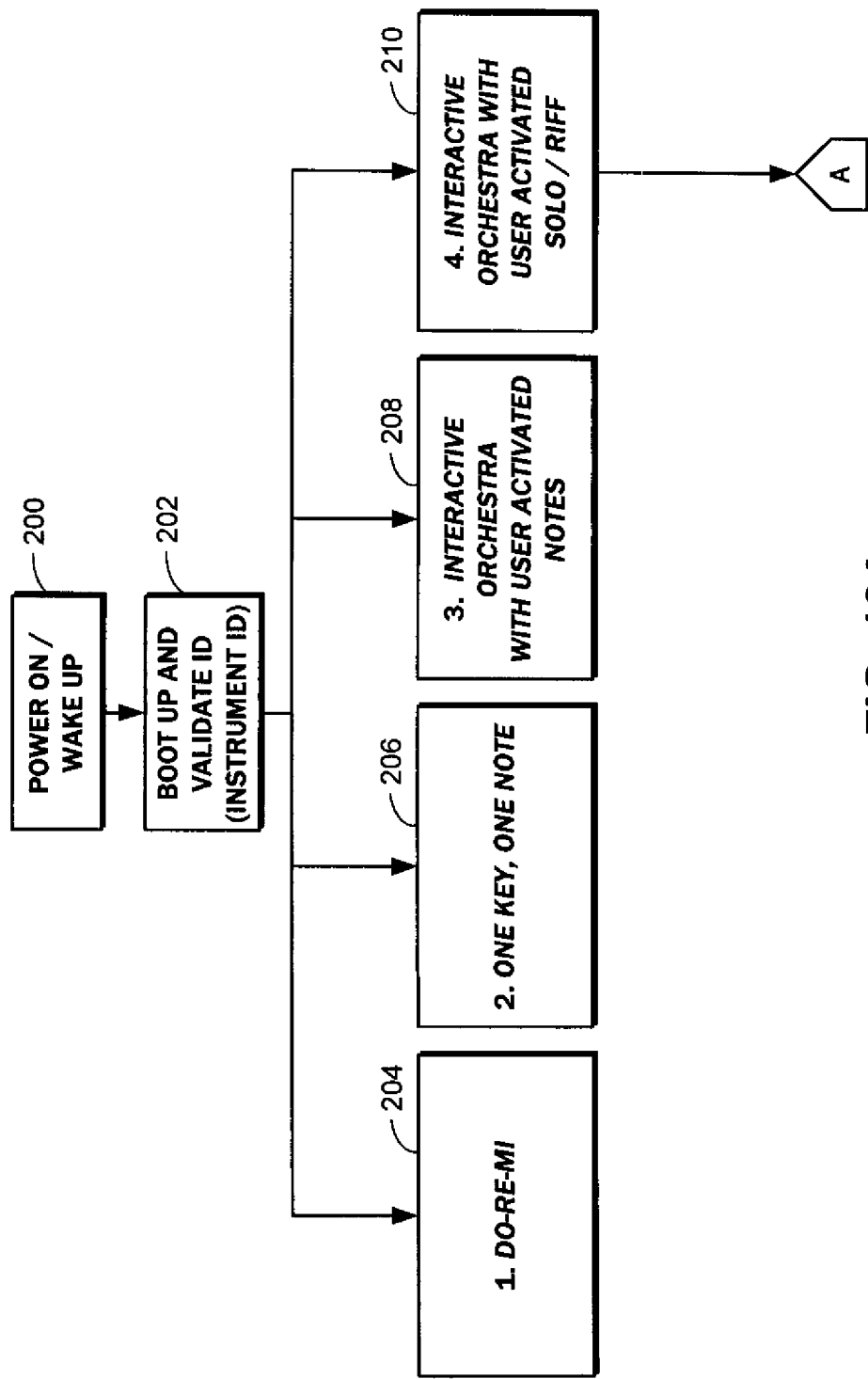
FIGS. 13A-13E are flowcharts depicting the executable software application loaded on to the interactive devices to provide the contemplated functionality of the present disclosure.
Figure 13B:
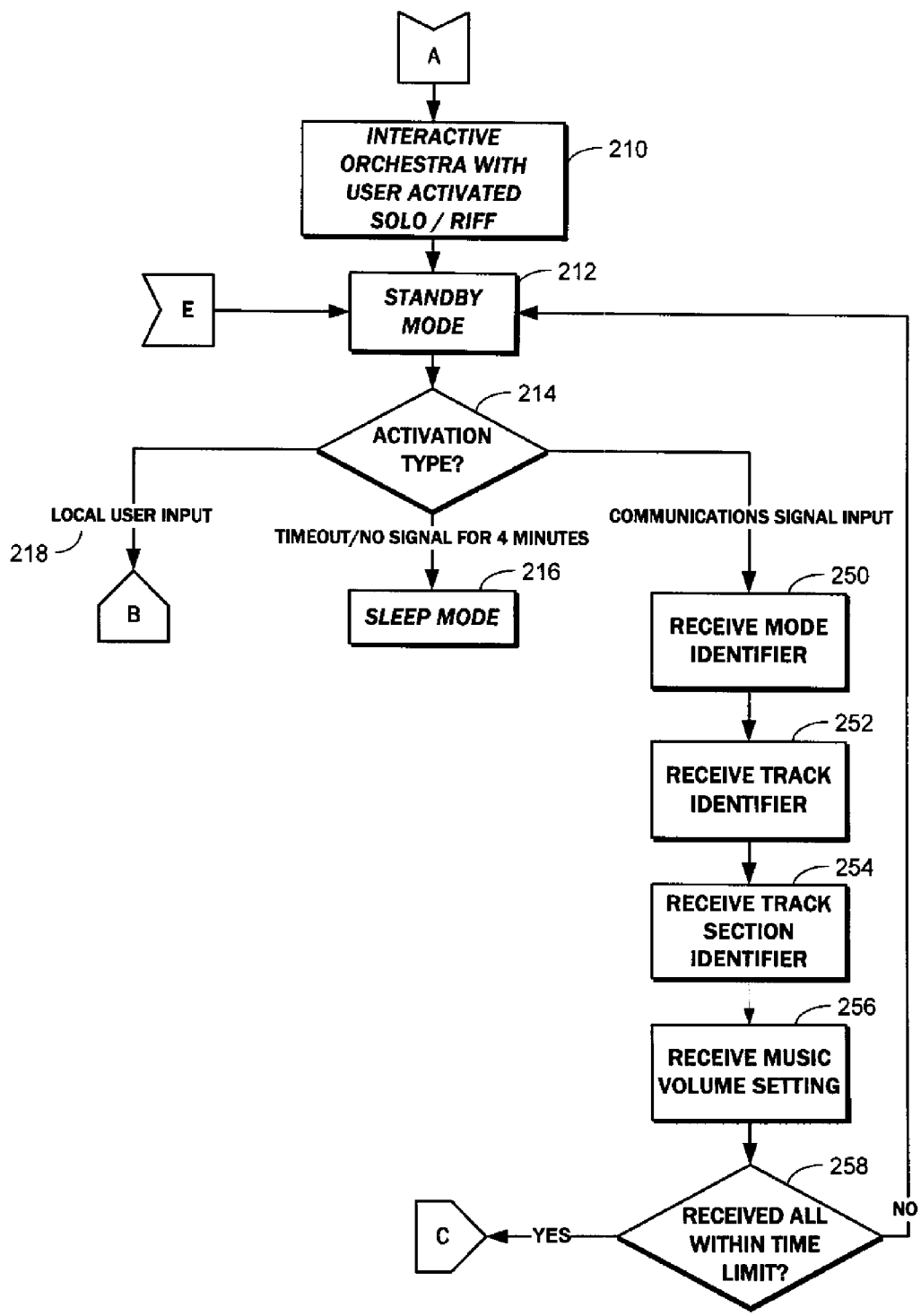
Figure 13C:
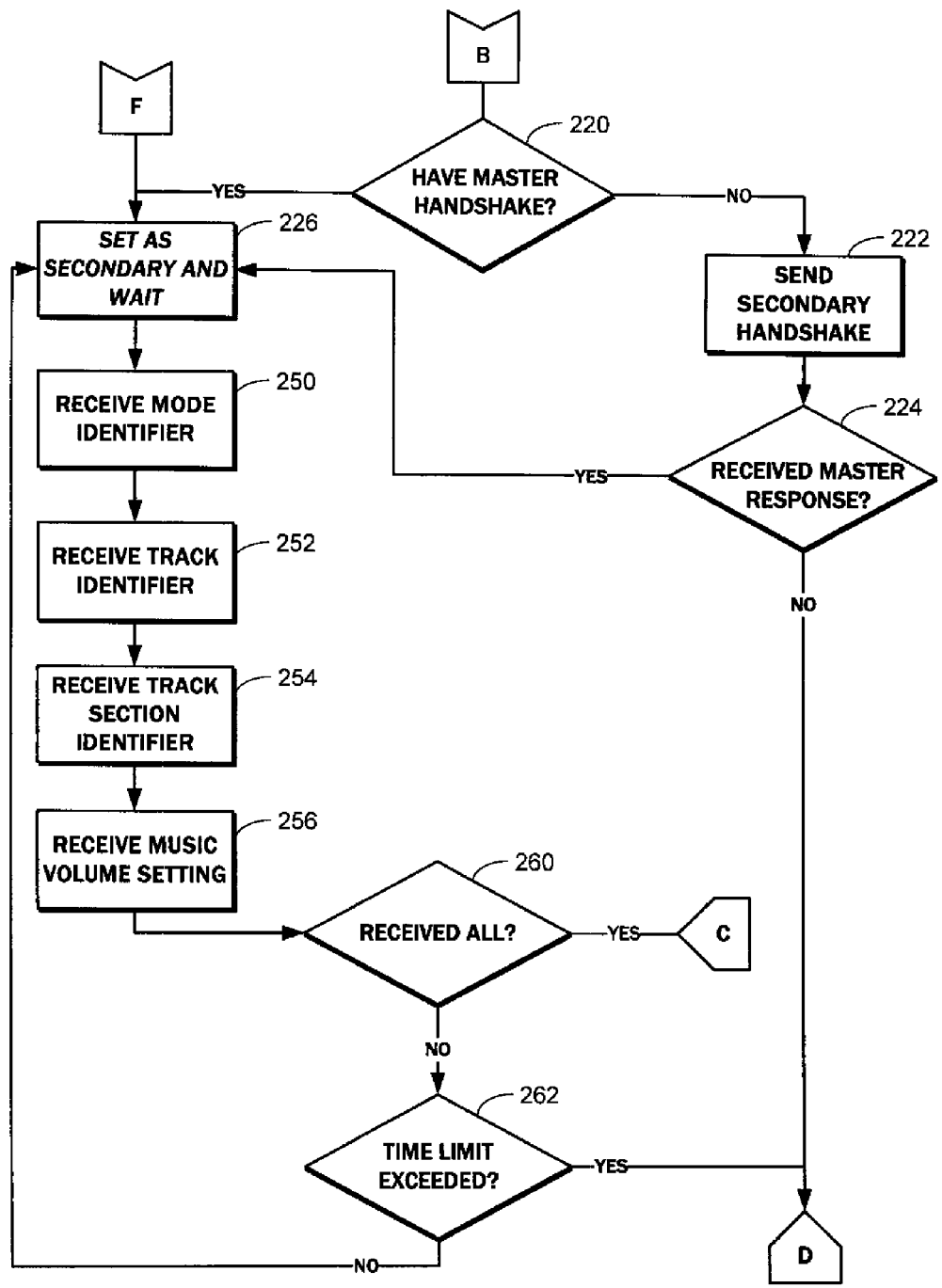

The primary/secondary status negotiation process amongst the interactive devices 12, as well as maintenance of playback synchrony of the audio sequences 18, 20, is implemented via software code executed by the programmable data processor 40. An exemplary embodiment of such executable code is depicted in the flowcharts of FIG. 13A-13C. Execution begins with a step 200 of powering on or waking up the interactive device 12. One of the ways in which the interactive device 12 may be woken is via a local user input. As shown in the schematic diagrams of FIGS. 4A, 5A, 6A, 7A, 8A, and 9A, regardless of the variant of the interactive device 12, there is a wake up/play/stop button 80. Pressing this transitions the interactive device 12 from the sleep state to a waken state, thus functioning as a "wake up" button. Various housekeeping tasks may be performed in step 202 including boot-up and the validation of the device identifier.

After boot-up, the interactive device 12, and more particularly the programmable data processor 40, can enter one of four operational categories. With reference to the schematic diagrams of FIG. 6A, 7A, 8A, and 9A, there is a four-position mode switch 82 that can be set to designate one of the four operational categories. As shown in FIG. 12, the third and fourth interactive devices 12*c*, 12*d* that simulate drums or congas, each includes a rotatable knob 84 that is contemplated to actuate the four-position mode switch 82. Similarly, the fifth and sixth interactive devices 12*e*, 12*f* that simulate the piano or harp also include the rotatable knob 84.

In a first position, the switch 82 sets a Do-Re-Mi operational category 204. Although implementation specifics may vary, for the interactive devices 12*e*, 12*f* capable of producing varying notes or scales, a press of the keys 73 generates its corresponding note or tone on the scale. For multi-tone percussive instruments such as the drum or conga, corresponding sounds are generated depending on which of the capacitive touch sensors 70 was activated as discussed above.

In a second position, the switch 82 sets a second, One Key, One Note operational category 206. With this operational category, each user input received on the input devices 48 (whether that is the key 73, the touch sensors 70, or the proximity sensors 66) plays a single note or audio sequence data element 38 of the respective audio sequence loaded on the interactive device 12 in order. This way, the user can experience "playing" music by merely pressing, tapping, and swiping various input devices without knowing which specific note to play.

A third operational category 208 and a fourth operational category 210 are essentially the same, as both contemplate an interactive orchestra. The difference relates to the functionality that can be activated via the input device 48. With the third operational category 208, the user inputs cause individual notes to be generated. On the other hand, with the fourth operational category 210, the user inputs cause a series of audio sequence data elements 38 to be played back. For purposes of conciseness, only the fourth operational category 210 will be described. Those having ordinary skill in the art will be able to recognize the modifications that can be made to the fourth operational category 210 to yield the functions possible with the third operational category 208.

Referring now to FIG. 13B, initially, a standby mode 212 is entered. From this point, the interactive device 12 may be activated in one of several contemplated ways, and in a decision block 214, a determination of such activation methods is made. If no activation occurs by way of one of the following for a predetermined time period (nominally 4 minutes, though this can be varied), then the interactive device 12 enters a sleep mode 216.

One of the ways in which the interactive device 12 may be activated is via a local user input 218. As shown in FIG. 13C, if the wake up/play/stop button 80 is pressed, then execution continues to a decision block 220 where it is determined whether the interactive device 12 is in possession of a master/primary handshake from another interactive device 12. If not, it is understood that the user activated this interactive device 12 first, and no other one has attempted to assert master/primary status. As best shown in FIG. 12, the interactive device 12 includes the wake up/play/stop button 80 that is readily accessible by the user. A secondary handshake 222 is broadcast to confirm that no other local area interactive device 12 has already asserted master/primary status. Any interactive device 12a that has master/primary status should respond with a master response upon receipt of a secondary handshake 222. Accordingly, when the interactive device 12 transmits the secondary handshake 222 but does not receive a master response in return, then it can, with a greater degree of certainty, establish itself as the master/primary. Otherwise, it establishes itself as a secondary 226 and waits for further commands from the master. At this point in the execution, the wake up/play/stop button 80 is operative to transition the interactive device 12 from the wake state to a play state, thereby functioning as a "play" button).

Figure 13D:
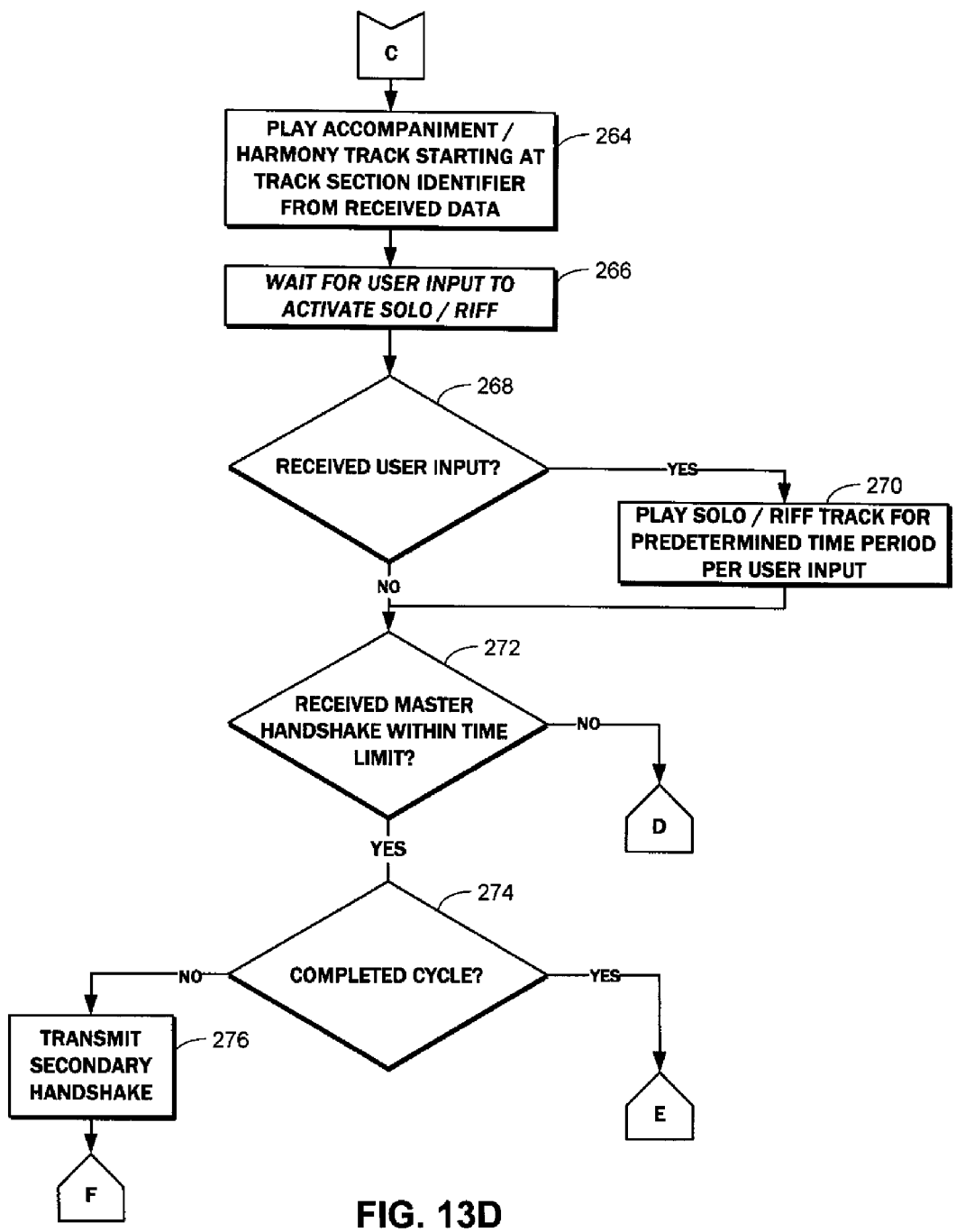
Figure 13E:
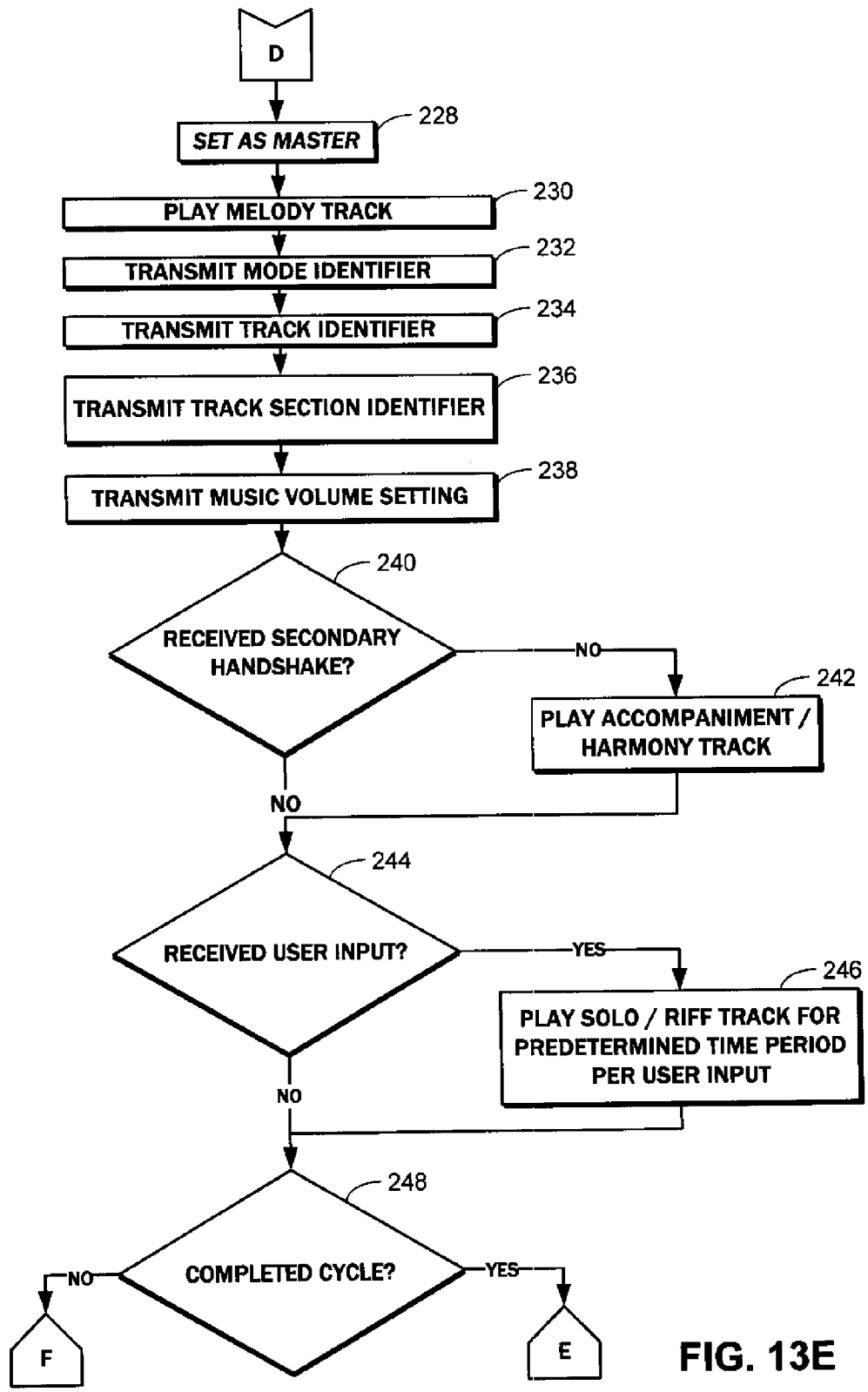

As shown in FIG. 13E, the interactive device 12a then establishes itself as a master/primary per step 228, and begins playing the melody track 230, or more broadly, the primary track 26. If at any point during the playback of the primary track 26 the wake up/play/stop button 80 is pressed, then such playback is stopped, and the execution jumps back to the standby mode 212. At each point in the primary track 26 that a track section identifier 56 is encountered, the primary interactive device 12a transmits a mode identifier 232, which defines specific operating category (orchestra, either user activated notes 208 or user activated solo/riff 210). Additionally, a track identifier 234, or more broadly, the first audio sequence identifier 22 that sets forth the particular group of tracks that are currently being played back, is transmitted. The processed track section identifier 56 is also transmitted 236, along with the volume setting 238.

It is expressly contemplated that when the primary interactive device 12a is operating without cooperation with any others in the vicinity, then both the primary track 26 and the secondary track 28 are played back together, synchronously. In a decision block 240, the primary interactive device 12a checks to see if any secondary interactive devices 12b are currently active, as any such active ones should transmit the secondary handshake. If not, then the accompaniment, harmony, or secondary track 28 is played per step 242. To visually indicate that the interactive device 12 is set to be a master/primary, the red-colored first LED 54a may be illuminated. When the accompaniment, harmony, or secondary track 28 is also being played back, the green-colored second LED 54b may also be illuminated. This is by way of example only, and any other configuration and arrangement of lights may be substituted.

As mentioned above, user inputs provided to the input devices 48 can add another layer of interactivity to the playback of the audio sequences or songs on the interactive device. As a master/primary (or even as a secondary, for that matter, as will be described in greater detail below) the execution continues to check for received user input 244. If there has been a user input, then the tertiary track 30, also referred to as the solo or riff track, is played back in a step 246 for a predetermined time period per instance of detected user input. The play back of the solo or tertiary track 30 is also synchronous with the play back of the primary track 26. Considering that the programmable data processor 40 is synthesizing a particular audio sequence data element 38 with a definite sequence number or timestamp, it is understood that audio sequence data element 38 of the tertiary track 30 with the same sequence number or timestamp is retrieved and synthesized. This also applies to the synchronous playback of the secondary track 28. The playback of the primary track 26 continues so long as a user input via the input devices 48 is received.

When multiple tracks are being synthesized or mixed at once, it is understood that less than ideal acoustic performance may result. Accordingly, the reduction in volume of certain tracks, whether that is the primary track 26, the secondary track 28, or the tertiary track 30, is contemplated. By reducing the volume, it is envisioned to smooth out the audio output mix for more pleasant listening. Although this aspect has been discussed in relation to the mixing of audio output from a single interactive device 12, such volume reduction or output audio shaping is applicable in the context of multiple remote interactive devices 12 generating respective secondary tracks 34 and tertiary tracks 36. In another embodiment, the playback of the tertiary track 30, 36 is understood to be at the highest volume level, the playback of the primary track 26, 32 is understood be lower than that of the tertiary track 30, 36 but higher than that of the secondary track 28, 34. The relative volume levels may be pre-set, or in the alternative, determined based on the received volume level 256 in the synchronization command.

Upon reaching the end of the first audio sequence 18, in a decision block 248 it is determined whether a play cycle has been completed. The number of compositions or audio sequences played back can be varied, though by way of example, one embodiment contemplates three. In other words, if three songs have been played, the cycle is complete, and execution returns to the standby mode 212. Otherwise, the interactive device 12 sets itself to secondary status 226, and waits until another one asserts itself as a master/primary, or the more likely, until timing out, at which point master/primary status is reestablished per step 228.

Having covered the functionality of the interactive device 12 in the master/primary mode, the functionality of the same in the secondary mode will now be considered. Referring back to the flowchart of FIG. 13B, one of the other ways in which the interactive device 12 can be activated is by receipt of a communication signal from a remote, primary interactive device 12a that has already asserted itself to be a master/primary. The same data items that were transmitted by the primary interactive device 12a as discussed above, are now being received. More particularly, the mode identifier is received per step 250, along with the song or audio sequence identifier 22 in a step 252, the track section identifier 56 in a step 254, and the volume setting in a step 256. These items, collectively, may be referred to as synchronization commands. It is to be understood that the enumeration of such identifiers is not intended to be exclusive, and other identifiers may also be incorporated. If all such data is received within a predetermined time limit as evaluated in a decision block 258, execution continues to secondary status functionality further detailed in the flowchart of FIG. 13D. If not all of the data is received within the time limit, execution returns to the standby mode 212.

Once a primary interactive device 12a has been established within the local vicinity, it is possible for multiple other secondary interactive devices 12b to join the communications link. Negotiating with the primary interactive device 12a is sufficient, and no other involvement from existing secondary interactive devices 12b is necessary. If the interactive device 12 can receive the foregoing data within the time limit set, then it too can become a secondary interactive device 12b.

Another possible way in which the interactive device 12 may be set to secondary status is receiving or otherwise detecting the local user input 218 by way of the wake up/play/stop button 80. After checking for the master handshake in decision block 220, it may be ascertained that one has indeed been received. This is understood to mean that another local interactive device 12 had already asserted master/primary status, notwithstanding the local user input 218. In such case, the interactive device 12b defaults to the secondary mode, and once again, waits until the expiration of a timeout or the receipt of the synchronization commands. As indicated above, this includes the mode identifier received in step 250, the song or audio sequence identifier 22 in the step 252, the track section identifier 56 in the step 254, and the volume setting in the step 256. If the entirety of this data has been received per decision block 260, execution continues to the secondary mode functions as more fully discussed below with reference to the flowchart of FIG. 13D. Otherwise, so long as the timeout period has not expired per decision block 262, the interactive device 12b continues to wait until the synchronization command is completely received. If the timeout period expires, then this is understood to mean that no other interactive device 12 in the local vicinity has an established master/primary status, and so it becomes one instead. Execution continues to the master/primary mode functions described above.

In the secondary mode, the secondary interactive device 12b plays the secondary track 34 loaded thereon starting at the track section identifier 56 that is part of the synchronization command according to a step 264. If at any point during the playback of the secondary track 34 the wake up/play/stop button 80 is pressed, then such playback is stopped, and the execution jumps back to the standby mode 212. While continuing to play the secondary track 34, the secondary interactive device 12b waits 266 for user input from the input device 48. When a decision block 268 detects such input, the solo, riff, or tertiary track 36 loaded on the secondary interactive device 12b is played in a step 270, in synchrony with the secondary track 34 being played, as well as the primary track 26 being played on the primary interactive device 12a.

The playback of the secondary track 34 is in accordance with the operational category as specified in the received mode identifier 250. For instance, if the mode identifier designates a second operational category 206 (One Key, One Note), then only a single audio sequence data element 38 is generated per input received on the primary interactive device 12a. The behavior of the secondary interactive device 12b when set to the other operational categories is likewise the same as those discussed above. The operational category designated by the master/primary is understood to be controlling, regardless of the position of the switch 82 set to a different operational category.

The secondary handshake is used to maintain the status of a given interactive device 12 as the master/primary, as described above, and so too, is the master handshake utilized to maintain the secondary status of a given interactive device 12. The decision block 272 checks to whether the master handshake has been received within a predetermined time limit. If not, this means that there is no ongoing communication with the primary interactive device 12a, and so the existing secondary interactive device 12b is switched over to a master/primary. The periodic transmission of the synchronization command, which includes the track section identifiers, maintains the synchrony of the secondary interactive device 12b by advancing to or retreating from the play back of the secondary track 34.

If communications with the primary interactive device 12a is ongoing, the next decision block 274 determines whether a cycle (three songs played) has been completed. Just as a completed cycle in the master/primary functionality next led to the standby mode 212, completion of a cycle in the secondary functionality leads to the same standby mode 212. If not, the secondary handshake is transmitted in step 276, and again sets the secondary status of the interactive device 12b to wait to receive further playback and synchronization commands from the master/primary.

Although the audio playback amusement system 10 has been described in the context of two similarly configured dolls or interactive devices 12, it is also possible for one interactive device 12 to communicate with and receive synchronization commands from a primary/master that is not so configured. For example, such a device could be a personal computer, tablet or other general purpose data processing apparatus on which interface software could be installed. The interface software could communicate with one or more interactive devices 12 utilizing conventional data link standards such as USB, two-way IR dongle, Bluetooth, WiFi, and permit the control thereof, including the playback of melody tracks, harmony tracks, accompaniment tracks, solo tracks, riff tracks, and the like via the interface software. In general, the same features of the interactive device 12 as described above could be incorporated into the interface software.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

What is claimed is:

1. A method for synchronized audio output between a first device and a second device, the method comprising:
    generating on the first device a first audio output corresponding to a primary track defined by a plurality of sequential audio data elements and one or more first playback synchronization identifiers stored together and associated with specific audio data elements at spaced intervals of the sequential audio data elements of the primary track;
    transmitting, to the second device, synchronization commands corresponding to the first playback synchronization identifiers as playback of the primary track on the first device advances to those specific audio data elements that include the associated first playback synchronization identifiers;

generating a second audio output of a secondary track on the second device in synchrony with the first audio output on the first device, the secondary track being defined by a plurality of sequential audio data elements and one or more second playback synchronization identifiers stored together and associated with specific audio data elements at spaced intervals of the sequential audio data elements of the secondary track, relative positions of the first playback synchronization identifiers and the second playback synchronization identifiers along the sequential audio data elements of the respective primary and secondary tracks are substantially the same;

wherein synchrony between the first device and the second device is maintained with the transmitted synchronization commands independent of any internal clocks of the first device and the second device, playback of the second audio output being adjusted to a specific one of the sequential audio data elements with the associated second synchronization identifier as directed by the synchronization commands from the first device.

2. The method of claim 1, wherein the audio data elements of the primary track and the secondary track each have an associated time sequence identifier, each of the audio data elements of the primary track having a same time sequence identifier value as a corresponding one of the audio data elements of the secondary track.

3. The method of claim 2, further comprising:
receiving a user input on the first device; and
mixing into the first audio output, in response to the user input, audio data elements of a tertiary track stored on the first device.

4. The method of claim 3, wherein the audio data elements of the tertiary track each have an associated time sequence identifier, a one of the mixed-in audio data elements of the tertiary track at a given time instance having a same time sequence identifier value as that of a one of the audio data elements of the primary track being played back at substantially the same given time instance.

5. The method of claim 4, further comprising:
discontinuing the mixing in of the audio data elements of the tertiary track into the first audio output in response to a termination of the user input.

6. The method of claim 3, wherein volume of the audio data elements of the primary track are lower than that of the audio data elements of the tertiary track being mixed into the first audio output.

7. The method of claim 3, wherein:
the primary track is a melody track of a song;
the secondary track is one of an accompaniment track and a harmony track of the song; and
the tertiary track is one of a riff track and a solo track of the song.

8. The method of claim 1, further comprising:
transmitting, to a third device, the synchronization commands corresponding to the first playback synchronization identifiers as the playback of the primary track on the first device advances to those specific audio data elements that include the associated first playback synchronization identifiers;
generating a third audio output of a second secondary track on the third device in synchrony with the first audio output on the first device and the second audio output on the second device, the second secondary track being defined by a plurality of sequential audio data elements and one or more third playback synchronization identifiers associated with specific audio data elements at spaced intervals, relative time instances of the first playback synchronization identifiers of the primary track, the second playback synchronization identifiers of the first secondary track, and the third playback synchronization identifiers of the second secondary track being substantially the same;

wherein synchrony between the first device and the third device is maintained with the transmitted synchronization commands, playback of the third audio output being adjusted to a specific one of the sequential audio data elements with the associated third playback synchronization identifiers as directed by the synchronization commands from the first device.

9. The method of claim 1, wherein the primary track is a melody track of a song.

10. The method of claim 1, wherein the first secondary track is one of an accompaniment track and a harmony track of a song.

11. The method of claim 1, wherein the primary track is defined by aural characteristics of a first instrument.

12. The method of claim 11, wherein the secondary track is defined by aural characteristics of a second instrument.

13. The method of claim 12, wherein the aural characteristics of the first instrument are different from the aural characteristics of the second instrument.

14. The method of claim 1, wherein the audio data elements are stored as one or more Musical Instrument Digital Interface (MIDI) data files.

15. The method of claim 1, wherein the audio data elements are represented as pulse-code modulated values of corresponding analog audio signals.

16. The method of claim 1 wherein the primary track and the secondary track are each defined by a plurality of musical notes each associated with a timestamp, the method further comprising:
corresponding the first audio output generated on the first device to a first one of the musical notes of the primary track;
transmitting a first timestamp associated with the first one of the musical notes to the second device as a synchronization timestamp; and
corresponding the second audio output generated on the second device to a first one of the musical notes of the second track, the received synchronization timestamp corresponding to a second timestamp associated with the first one of the musical notes of the secondary track being generated as the second audio output.

17. The method of claim 16, wherein the synchronization timestamp is received by a third device with a third track defined by a plurality of musical notes each associated with a timestamp.

18. The method of claim 17, further comprising:
generating on the third device a third audio output corresponding a first one of the musical notes of the third track, the received synchronization timestamp corresponding to a third timestamp associated with the first one of the musical notes of the third track being generated as the third audio output.

19. The method of claim 16, wherein after generating the first audio output, the method includes establishing a communications link between the first device and the second device, the first device being negotiated as primary and the second device being negotiated as secondary.

20. The method of claim 19, wherein prior to generating the first audio output on the first device, the method includes the first device broadcasting a first status message, the first device being established as primary absent responses from the second device.

21. The method of claim 20, wherein prior to generating the second audio output on the second device, the method includes the second device broadcasting a second status message and the first device responding thereto, upon reception of the response from the first device, the second device being established as secondary.

22. A method for synchronized audio output between a first device and a second device, the method comprising:
- generating on the first device a first audio output corresponding to a primary track defined by a plurality of sequential audio data elements of musical notes each associated with a timestamp and one or more first playback synchronization identifiers associated with specific audio data elements at spaced intervals;
- corresponding the first audio output generated on the first device to a first one of the musical notes of the primary track;
- transmitting, to the second device, synchronization commands corresponding to the first playback synchronization identifiers as playback of the primary track on the first device adjusts to those specific audio data elements including the associated first playback synchronization identifiers, one of the synchronization commands being a first timestamp associated with the first one of the musical notes; and
- generating a second audio output of a secondary track on the second device in synchrony with the first audio output on the first device, the secondary track being defined by a plurality of sequential audio data elements of musical notes each associated with a timestamp and one or more second playback synchronization identifiers associated with specific audio data elements at spaced intervals, relative time instances of the first playback synchronization identifiers of the primary track and the second playback synchronization identifiers of the secondary track being substantially the same;
- corresponding the second audio output generated on the second device to a first one of the musical notes of the secondary track, the received synchronization timestamp corresponding to a second timestamp associated with the first one of the musical notes of the secondary track being generated as the second audio output;
- wherein synchrony between the first device and the second device is maintained with the transmitted synchronization commands, playback of the second audio output being adjusted to a specific one of the sequential audio data elements with the associated second synchronization identifier as directed by the synchronization commands from the first device.

23. The method of claim 22, wherein the synchronization timestamp is received by a third device with a third track defined by a plurality of musical notes each associated with a timestamp.

24. The method of claim 23, further comprising:
- generating on the third device a third audio output corresponding a first one of the musical notes of the third track, the received synchronization timestamp corresponding to a third timestamp associated with the first one of the musical notes of the third track being generated as the third audio output.

25. The method of claim 22, wherein after generating the first audio output, the method includes establishing a communications link between the first device and the second device, the first device being negotiated as primary and the second device being negotiated as secondary.

26. The method of claim 25, wherein prior to generating the first audio output on the first device, the method includes the first device broadcasting a first status message, the first device being established as primary absent responses from the second device.

27. The method of claim 26, wherein prior to generating the second audio output on the second device, the method includes the second device broadcasting a second status message and the first device responding thereto, upon reception of the response form the first device, the second device being established as secondary.

* * * * *